United States Patent
Grantham et al.

(10) Patent No.: US 12,391,540 B2
(45) Date of Patent: Aug. 19, 2025

(54) PRESSURE/VACUUM (PV) VALVE FOR FUEL STORAGE TANKS, IN-LINE PRESSURE-VACUUM VALVE TEST UNIT, AND COMBINATION THEREOF

(71) Applicant: VAPOR SYSTEMS TECHNOLOGIES, INC., Springboro, OH (US)

(72) Inventors: Rodger Preston Grantham, Springfield, MO (US); Douglas Alan Harty, Modesto, CA (US); Gregg Marshel, San Tan Valley, AZ (US)

(73) Assignee: Vapor Systems Technologies, Inc., Springboro, OH (US)

( * ) Notice: Subject to any disclaimer, the term of this patent is extended or adjusted under 35 U.S.C. 154(b) by 64 days.

(21) Appl. No.: 18/484,054

(22) Filed: Oct. 10, 2023

(65) Prior Publication Data
US 2024/0043261 A1    Feb. 8, 2024

Related U.S. Application Data

(62) Division of application No. 17/566,355, filed on Dec. 30, 2021, now Pat. No. 11,795,049.

(60) Provisional application No. 63/131,891, filed on Dec. 30, 2020.

(51) Int. Cl.
*B67D 7/36* (2010.01)
*B67D 7/32* (2010.01)
*F16K 17/19* (2006.01)
*F16K 17/28* (2006.01)

(52) U.S. Cl.
CPC .......... *B67D 7/365* (2013.01); *B67D 7/3227* (2013.01); *F16K 17/285* (2013.01)

(58) Field of Classification Search
CPC ....... B67D 7/365; F16K 17/19; F16K 17/194; F16K 17/285
See application file for complete search history.

(56) References Cited

U.S. PATENT DOCUMENTS

| | | | | |
|---|---|---|---|---|
| 3,927,553 A | * | 12/1975 | Frantz | G01L 27/00 137/625.68 |
| 4,566,423 A | * | 1/1986 | Kenny | F02M 26/48 137/907 |
| 5,560,548 A | * | 10/1996 | Mueller | F16L 37/248 4/615 |

(Continued)

*Primary Examiner* — Paul J Gray
(74) *Attorney, Agent, or Firm* — Thomas E. Lees, LLC

(57) ABSTRACT

A flow-through pressure-vacuum valve includes a valve body having a tank-side opening and a vent-side opening. A pressure relief valve (e.g., a ball held in a corresponding seat by gravity) is positioned within a first passageway through the body. The ball is moved from the first valve seat to open the first passageway when pressure at the tank-side opening exceeds pressure at the vent-side opening by a predetermined pressure differential. A vacuum relief valve is positioned within another passageway (e.g., a serpentine passageway). The vacuum relief valve (e.g., also a ball held in a corresponding seat by gravity) is positioned within the serpentine passageway. Analogously, the ball is moved from the valve seat to open the serpentine passageway when pressure at the tank-side opening is less than the pressure at the vent-side opening by a predetermined pressure differential.

4 Claims, 17 Drawing Sheets

(56) References Cited

U.S. PATENT DOCUMENTS

| | | | |
|---|---|---|---|
| 6,569,117 B1* | 5/2003 | Ziv | A61M 39/02 |
| | | | 604/246 |
| 7,341,097 B2* | 3/2008 | Darby | F01P 11/16 |
| | | | 73/866.5 |
| 7,566,045 B2* | 7/2009 | June | E21B 33/0387 |
| | | | 137/625.48 |
| 8,445,286 B2* | 5/2013 | Bair | G01N 15/1404 |
| | | | 137/15.04 |
| 2006/0102238 A1* | 5/2006 | Watson | E21B 33/0387 |
| | | | 137/613 |

* cited by examiner

PRESSURE/VACUUM (PV) VALVE FOR FUEL STORAGE TANKS, IN-LINE PRESSURE-VACUUM VALVE TEST UNIT, AND COMBINATION THEREOF

CROSS REFERENCE TO RELATED APPLICATIONS

This application is a divisional application of U.S. patent application Ser. No. 17/566,355, filed on Dec. 30, 2021, having the title "PRESSURE/VACUUM (PV) VALVE FOR FUEL STORAGE TANKS, IN-LINE PRESSURE-VACUUM VALVE TEST UNIT, AND COMBINATION THEREOF," which claims the benefit of U.S. Provisional Patent Application Ser. No. 63/131,891, filed Dec. 30, 2020, having the title "PRESSURE/VACUUM (PV) VALVE FOR FUEL STORAGE TANKS, IN-LINE PRESSURE-VACUUM VALVE TEST UNIT, AND COMBINATION THEREOF", the disclosures of which are hereby incorporated by reference as if set forth expressly in their entireties.

BACKGROUND

The present disclosure relates generally to a fuel dispensing system for vehicles. More particularly, aspects of the present disclosure relate to a pressure-vacuum (PV) valve for fuel storage tanks, a venting system incorporating the PV valve, an in-line PV valve test unit, the in-line PV valve test unit integrated into the venting system for testing the PV valve, and combinations thereof.

Liquid fuel storage tanks, such as gasoline storage tanks, are normally required to have what is commonly referred to as a Pressure/Vacuum (or PV), valve on a tank vent pipe extending between the storage tank and the atmosphere. The purpose of a PV valve is to normally seal the storage tank from the atmosphere so that liquid fuel, e.g., gasoline, cannot evaporate from the storage tank and escape into the atmosphere.

However, a PV valve can open at a predetermined positive pressure within the storage tank in order to allow the excessive positive pressure within the storage tank system to vent to atmosphere. The PV valve can also open at a predetermined vacuum pressure within the storage tank in order to allow the excessive negative pressure within the storage tank system to relieve relative to atmosphere.

BRIEF SUMMARY

According to aspects of the present disclosure, a flow-through pressure-vacuum valve comprises a valve body having a tank-side opening and a vent-side opening, which can be opposite the tank-side opening. A first passageway extends through the valve body from the tank-side opening to the vent-side opening. Also, a second passageway extends through the valve body from the tank-side opening to the vent-side opening. Yet further, a third passageway extends through the valve body from the tank-side opening to the vent-side opening.

A first pressure relief valve is positioned within the first passageway. The first pressure relief valve comprises a first valve seat and a first valve member. Here, the first valve member is moved into the first valve seat and is held therein by gravity to close the first passageway. The first valve member is moved from the first valve seat to open the first passageway when pressure at the tank-side opening of the valve body exceeds pressure at the vent-side opening of the valve body by a first predetermined pressure differential. Gravity closes the first valve member when pressure at the tank-side opening of the valve body no longer exceeds pressure at the vent-side opening of the valve body by the first predetermined pressure differential.

A second pressure relief valve is positioned within the second passageway. The second pressure relief valve comprises a second valve seat and a second valve member. The second valve member is moved into the second valve seat and is held therein by gravity to close the second passageway. The second valve member is moved from the second valve seat to open the second passageway when pressure at the tank-side opening of the valve body exceeds the pressure at the vent-side opening of the valve body by a second predetermined pressure differential, which is greater than the first predetermined pressure differential. Gravity closes the second valve member when pressure at the tank-side opening of the valve body no longer exceeds pressure at the vent-side opening of the valve body by the second predetermined pressure differential.

A third pressure relief valve is positioned within the third passageway. The third pressure relief valve comprises a third valve seat and a third valve member. The third valve member is moved into the third valve seat and is held therein by gravity to close the third passageway. The third valve member is moved from the third valve seat to open the third passageway when pressure at the tank-side opening of the valve body is less than the pressure at the vent-side opening of the valve body by a third predetermined pressure differential. Gravity closes the third valve member when pressure at the tank-side opening of the valve body is no longer less than the pressure at the vent-side opening of the valve body by the third predetermined pressure differential.

According to still further aspects of the present disclosure, a flow-through pressure-vacuum valve comprises a valve body having a tank-side opening and a vent-side opening. For instance, the vent-side opening can be opposite the tank-side opening. A pressure relief passageway extends through the valve body from the tank-side opening to the vent-side opening. Analogously, a vacuum release passageway extends through the valve body from the tank-side opening to the vent-side opening.

A pressure relief valve is provided within the pressure relief passageway. The pressure relief valve comprises a valve seat and a valve member. The valve member of the pressure relief valve is moved into the corresponding valve seat and is held therein by gravity to close the pressure relief passageway. The valve member is moved from the valve seat to open the pressure relief passageway when pressure at the tank-side opening of the valve body exceeds pressure at the vent-side opening of the valve body by a first predetermined pressure differential.

Additionally, a vacuum relief valve is provided within the vacuum release passageway. The vacuum relief valve also comprises a valve seat and a valve member. The valve member of the vacuum relief valve is moved into the corresponding valve seat and held therein by gravity to close the vacuum relief passageway. The valve member is moved from the valve seat to open the vacuum relief passageway when pressure at the tank-side opening of the valve body is less than the pressure at the vent-side opening of the valve body by a predetermined pressure differential.

In some embodiments, each valve seat comprises a conical indentation in the valve body, and each valve member comprises a free-floating spherical ball received in the associated conical indentation so as to be held therein by gravity. Moreover, in some embodiments, a volume of the second free-floating spherical ball is larger than a volume of the first free-floating spherical ball. Also, in some embodiments, a first cracking pressure for the pressure relief valve is determined by a size of the associated free-floating spherical ball, a composition of the associated free-floating spherical ball, a sidewall angle of the associated conical indentation, or a combination thereof. Likewise, a second cracking pressure, which is associated with the vacuum relief valve, is determined by a size of the associated free-floating spherical ball, a composition of the associated free-floating spherical ball, a sidewall angle of the associated conical indentation, or a combination thereof.

According to yet further aspects of the present disclosure, a flow-through pressure-vacuum valve system comprises a flow-through pressure-vacuum valve, a first vent pipe section that couples the flow-through pressure-vacuum valve to a storage tank, and a second vent pipe section that couples the flow-through pressure-vacuum valve to atmosphere. Here, the flow-through pressure-vacuum valve comprises a first pressure relief passageway coupling the first vent pipe to the second vent pipe, and a second pressure relief passageway coupling the first vent pipe to the second vent pipe. A first pressure relief valve closes the first passageway. The first pressure relief valve comprises a first valve seat and a first valve member, where the first valve member is moved into the first valve seat and is held therein by gravity to close the first passageway. The first valve member is moved from the first valve seat to open the first passageway when pressure in the first vent pipe section exceeds pressure at the second vent pipe section by a first predetermined pressure differential.

Likewise, a second pressure relief valve is provided so as to close the second passageway. The second pressure relief valve comprises a second valve seat and a second valve member. The second valve member is moved into the second valve seat and is held therein by gravity to close the second passageway. In some embodiments, the second valve member is moved from the second valve seat to open the second passageway when pressure in the first vent pipe section exceeds the pressure at the second vent pipe section by a second predetermined pressure differential, which is greater than the first predetermined pressure differential. In other embodiments, the second valve member is moved from the second valve seat to open the second passageway when pressure in the first vent pipe section is less than the pressure at the second vent pipe section by a second predetermined pressure differential.

According to further aspects of the present disclosure, a flow-through pressure-vacuum valve comprises a valve body having a tank-side opening and a vent-side opening. A first positive pressure relief valve is within a first passageway. The first positive pressure relief valve comprises a first valve seat and a first ball valve member, where the first ball valve member is moved into the first valve seat and is held therein by gravity to close the first passageway. The first ball valve member is moved from the first valve seat by a positive pressure exceeding a first predetermined threshold. A second positive pressure relief valve is within a second passageway. The second positive pressure relief valve comprises a second valve seat and a second ball valve member. The second ball valve member is moved into the second valve seat and is held therein by gravity to close the second passageway. The second ball valve member is moved from the second valve seat by a positive pressure exceeding a second predetermined threshold. A negative pressure relief valve is within a third passageway. The negative pressure relief valve comprises a third valve seat and a third ball valve member. The third valve member is moved into the third valve seat and is held therein by gravity to close the third passageway. The third ball valve member is moved from the third valve seat by a negative pressure exceeding a predetermined threshold.

According to still further aspects herein, a flow-through pressure-vacuum valve comprises a valve body having a tank-side opening and a vent-side opening, e.g., opposite the tank-side opening. A positive pressure relief valve is within a corresponding passageway. The positive pressure relief valve comprises a valve seat and a ball valve member, where the ball valve member is moved into the valve seat and is held therein by gravity to close the corresponding passageway. The ball valve member is moved from the valve seat by a positive pressure exceeding a first predetermined threshold. Additionally, a negative pressure relief valve is within a corresponding passageway. The negative pressure relief valve also comprises a valve seat and a ball valve member, where the ball valve member is moved into the valve seat and is held therein by gravity to close the corresponding passageway. The ball valve member of the negative pressure relief valve is moved from its corresponding valve seat by a negative pressure exceeding a predetermined threshold.

According to yet further aspects of the present disclosure, an in-line pressure-vacuum valve test unit comprises a body having a tank-side end, a valve-side end, and an axial passageway. The axial passageway extends entirely through the body from the tank-side end to the valve-side end and defines a tank-side port and a valve-side port. The in-line pressure-vacuum valve test unit also comprises a test port in a sidewall of the body. A radial passageway extends from the test port into the axial passageway. Yet further, the in-line pressure-vacuum valve test unit comprises a test probe having a hollow therethrough. The test probe is inserted into the test port such that the test probe extends through the radial passageway and into the axial passageway, the test probe seals the axial passageway between the tank-side port and a valve-side port, and the hollow in the test probe cooperates with the axial passageway to create a path through the hollow in the test probe, into the axial passageway, and through the valve-side port.

In some embodiments, the in-line pressure-vacuum valve test unit is integrated as part of an in-line pressure-vacuum valve test system. In this configuration, the in-line pressure-vacuum valve test system includes the in-line pressure-vacuum valve test unit described above, and a vent pipe. More particularly, a vent pipe having a first vent pipe segment is coupled to the tank-side port. The first vent pipe segment can couple for instance, to a storage tank. A pressure-vacuum valve (e.g., a pressure-vacuum valve according to any embodiment herein, or any other PV valve configuration) is coupled to the valve-side port of the in-line pressure-vacuum valve test unit, e.g., either directly or via a second vent pipe segment. In some embodiments, the in-line pressure-vacuum valve test unit can be user installed, and user-removable from the vent pipe. This configuration enables the in-line pressure-vacuum valve test unit to be temporarily installed, e.g., at a time of testing of the corresponding PV. In other embodiments, the in-line pressure-vacuum valve test unit can be permanently installed.

According to yet further aspects herein, an in-line pressure-vacuum valve test system comprises an in-line pressure-vacuum valve test unit comprising a body having a tank-side end, a valve-side end, and an axial passageway extending entirely through the body from the tank-side end to the valve-side end, where the axial passageway defines a tank-side port and a valve-side port. A test port is in a sidewall of the body, and a radial passageway extends from the test port into the axial passageway. A test probe has a hollow therethrough. The test probe is inserted into the test port such that the test probe extends through the radial passageway and into the axial passageway, the test probe seals the axial passageway between the tank-side port and a valve-side port, and the hollow in the test probe cooperates with the axial passageway to create a path through the hollow in the test probe, into the axial passageway, and through the valve-side port. A vent pipe having a first vent pipe segment is coupled to the tank-side port, and a pressure-vacuum valve is coupled to the in-line pressure-vacuum valve test unit.

DETAILED DESCRIPTION

According to various aspects of the present disclosure, a flow-through pressure-vacuum valve is provided for use with a venting system for fuel storage tanks, e.g., underground fuel storage tanks. Conventional pressure-vacuum valves are complex, often requiring springs, elaborate flow paths, and mechanical components that wear out or break over time. This complexity is particularly problematic for pressure-vacuum valves that are made of plastic. In this regard, it is possible that a conventional pressure-vacuum valve must be replaced frequently, e.g., as frequent as annually. However, aspects herein provide a pressure-vacuum valve that is simple, reliable, and includes a minimal number of moving parts. Moreover, aspects herein provide a pressure-vacuum valve that is field serviceable to clean the valve and provides parts that are durable, even with regard to withstanding harsh environments.

Pressure-Vacuum Valve

Figure 1:
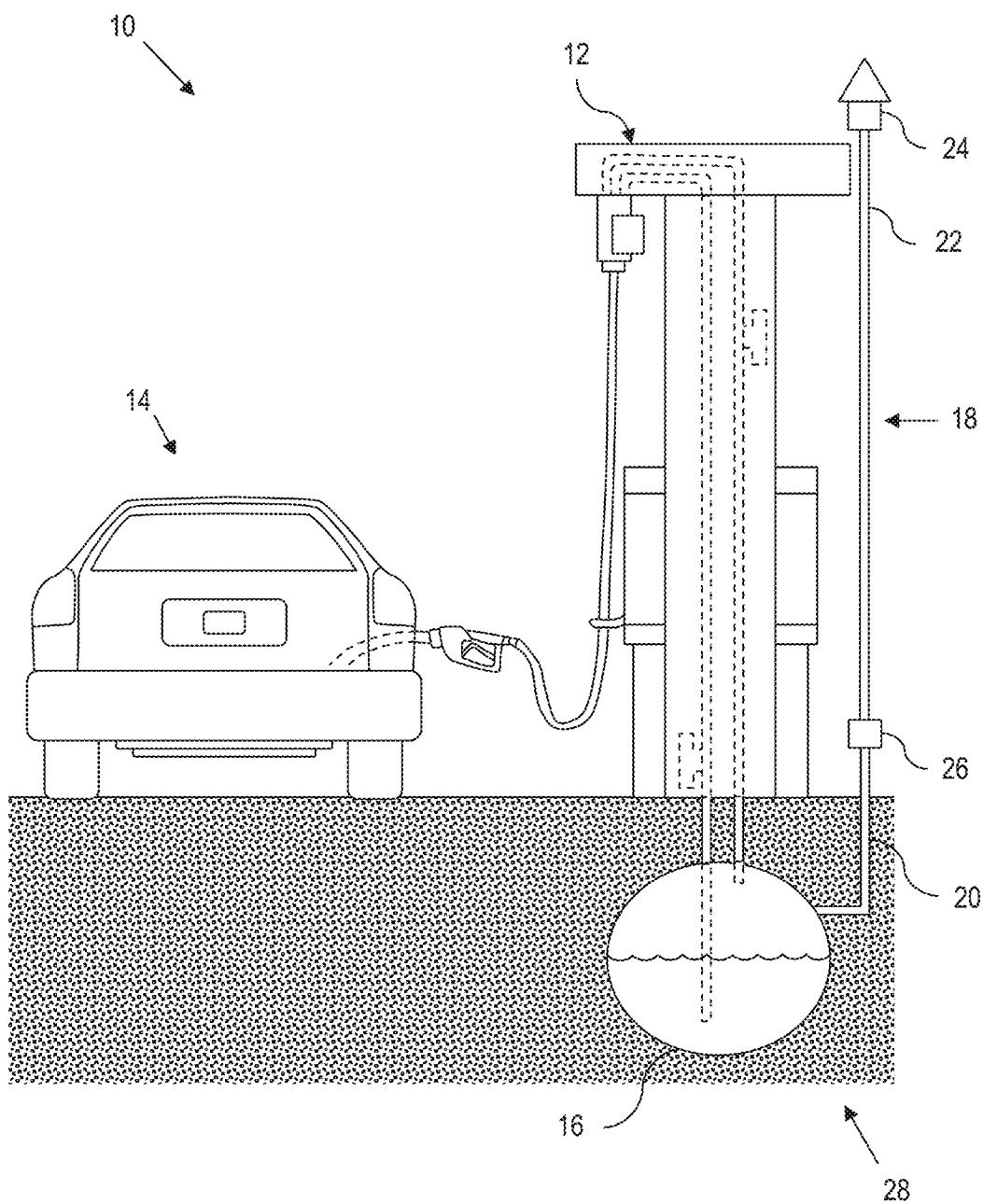
FIG. 1 is an exemplary refueling system according to aspects herein.

Referring now to the drawings, and in particular to FIG. 1, an example refueling station 10 is illustrated according to aspects herein. In general, a refueling system dispenser 12 is utilized to pump fuel, e.g., gasoline, into a vehicle 14. To accomplish this refueling task, the refueling system dispenser 12 pumps fuel from a fuel storage tank (e.g., implemented as an underground storage tank) 16 through the refueling system dispenser 12 and into a suitable holding tank on the vehicle 14.

Replenishing the fuel in the underground storage tank 16, e.g., from a tanker truck (not shown), and dispensing fuel from the underground storage tank 16 to the vehicle 14 displaces a mixture of fuel vapor and air inside the underground storage tank 16. Such activities can create circumstances where there is over or under pressure in the underground storage tank 16. To address over pressure and under pressure situations, a vent pipe 18 couples an interior volume of the underground storage tank 16 to atmosphere. For instance, as illustrated, the vent pipe 18 comprises a first vent pipe section 20, a second vent pipe section 22, and a vent cap 24. Additionally, a pressure-vacuum valve 26 is provided in-line, somewhere along the length of the vent pipe 18.

For instance, as illustrated, the pressure-vacuum valve 26 is implemented as a flow-through pressure-vacuum valve 26 situated in-line between the first vent pipe section 20 and the second vent pipe section 22. In this regard, the first vent pipe section 20 couples the flow-through pressure-vacuum valve 26 to an internal volume of the underground storage tank 16. Correspondingly, the second vent pipe section 22 couples the flow-through pressure-vacuum valve 26 to atmosphere, e.g., via the vent cap 24. In this regard, the vent cap 24 prevents water and other contaminants from entering the vent pipe section 22 at the distal end relative to the flow-through pressure-vacuum valve 26. Here, the vent pipe 18, in cooperation with the flow-through pressure-vacuum valve 26, forms a flow-through pressure-vacuum valve system 28.

In some embodiments, it is possible to position the pressure-vacuum valve 26 towards the distal end of the vent pipe 18, e.g., by positioning the pressure-vacuum valve 26 adjacent to the vent cap 24. However, in practical embodiments herein, it is also possible to position the pressure-vacuum valve 26 along the vent pipe 18 to a position that makes the pressure-vacuum valve 26 relatively easier to service. Note here that performance is not affected since the venting to atmosphere occurs at the vent cap 24 regardless of where the pressure-vacuum valve 26 is located in-line along the vent pipe 18.

By way of illustration, and not by way of limitation, the vent pipe 18 may be approximately 12 feet (approximately 3.66 meters) tall, e.g., from the surface from which the vent pipe 18 emerges from the underground storage tank 16, e.g., the ground level, extending vertically to the vent cap 24. In an example embodiment, the flow-through pressure-vacuum valve 26 is connected into the first vent pipe section 20 so as to position the flow-through pressure-vacuum valve 26 at a height of less than six feet (less than approximately 1.83 meters) from the surface (e.g., ground level) from which the vent pipe 18 emerges from the fuel storage tank. Other heights/positions along the vent pipe 18 can alternatively be implemented.

In example implementations, an optional in-line pressure-vacuum valve test unit (not shown) is in-line with the vent pipe 18 (or can be temporarily installable in-line with the vent pipe 18) below the flow-through pressure-vacuum valve 26. The in-line pressure-vacuum valve test unit enables test-in-place capability for testing the flow-through pressure-vacuum valve 26, examples of which are described more fully herein.

In a particular embodiment, the flow-through pressure vacuum valve 26 is connected into the first vent pipe section 20 so as to position the flow-through pressure-vacuum valve 26 at a height of up to four feet (approximately 1.22 meters) from the surface (e.g., ground level) from which the vent pipe 18 emerges from the fuel storage tank 16. In example implementations, an in-line pressure-vacuum valve test unit (not shown) can be optionally in-line with the vent pipe 18 (or can be temporarily installable in-line with the vent pipe 18) below the flow-through pressure-vacuum valve 26, as noted above.

Traditionally, a pressure-vacuum valve 26 is installed at the top of the vent pipe 18, e.g., just below the vent cap 24. Here, the vent pipe 18 can be about twelve feet (12' or approximately 3.66 meters) above ground level in accordance with requirements set by national and local fire codes. With the pressure-vacuum valve 26 installed at such a height, installation, removal, maintenance and testing of the pressure-vacuum valve 26 is prohibitive, necessitating the use of a ladder or a portable lift. Currently, typical practice requires the use of a portable lift for any work related to a pressure-vacuum valve 26 installed at a height near the top of the vent pipe 18 due to safety concerns, which makes such work relatively expensive. However, aspects herein provide a flow-through pressure-vacuum valve 26, allowing the pressure-vacuum valve 26 to be positioned in-line with the vent pipe 18, e.g., at a height that allows inspection and servicing without requiring special equipment to reach the top of the vent pipe 18.

Figure 2:
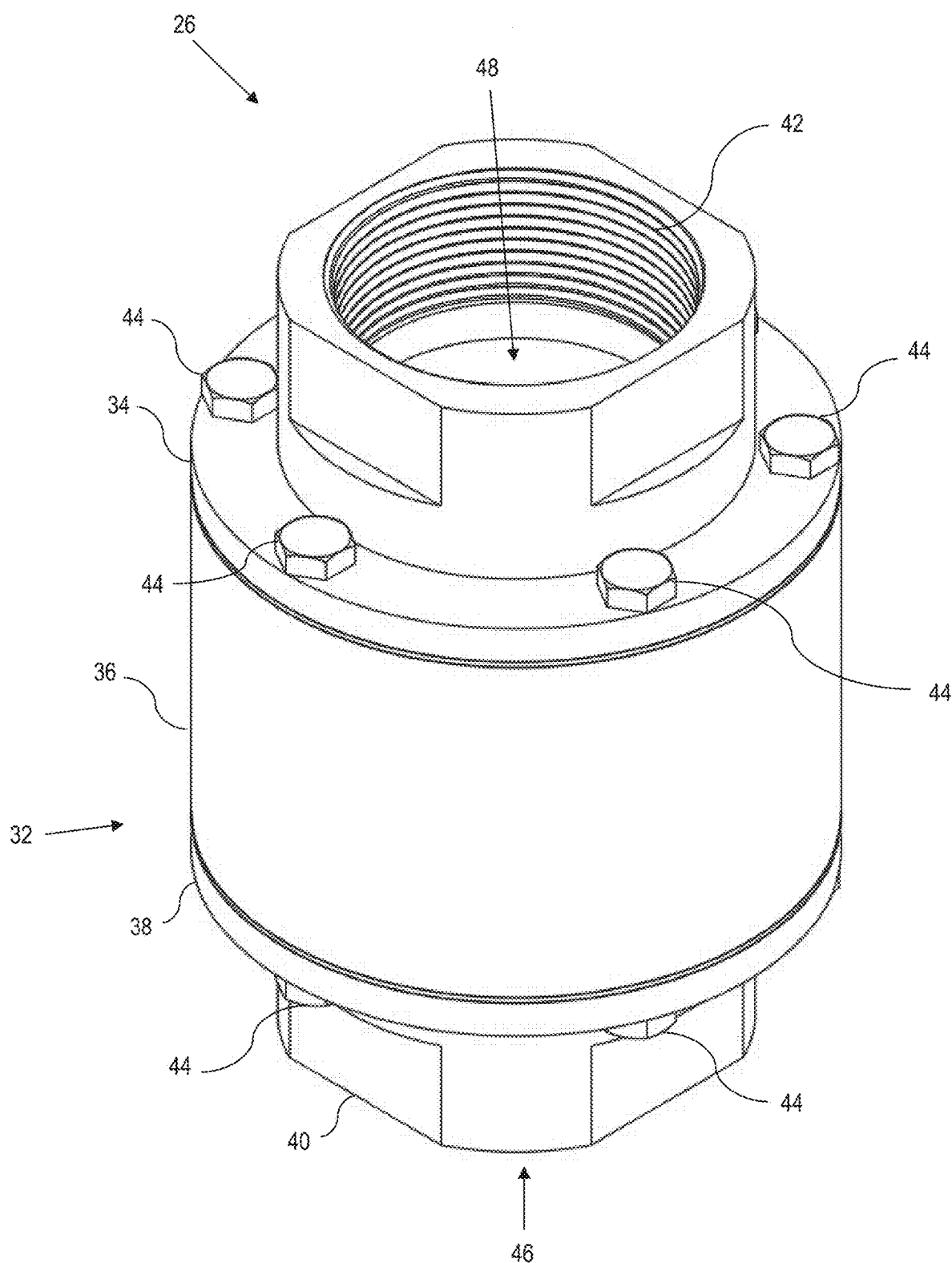
FIG. 2 is a perspective view of an example flow-through pressure-vacuum valve according to aspects herein.

Referring to FIG. 2, a perspective view of the flow-through pressure-vacuum valve 26 is illustrated. For instance, as illustrated, the flow-through pressure-vacuum valve 26 has a valve body 32 defined by an optional vent-side flanged member 34, a valve body section 36, and an optional tank-side flanged member 38. The tank-side flanged member 38 includes a tank-side internal receiver 40 (e.g., internally threaded portion, socket, etc.), that enables rapid assembly to a first vent pipe section (e.g., the first vent pipe section 20, FIG. 1). Analogously, the vent-side flanged member 34 includes a vent-side internal receiver 42 (e.g., internally threaded portion, socket, etc.), that enables rapid assembly to the second vent pipe section (e.g., the second vent pipe section 22, FIG. 1). For sake of illustration, the vent-side flanged member 34, the valve body section 36, and the tank-side flanged member 38 are coupled in sealingly tight relationship using one or more fasteners, e.g., bolts 44. Other configurations of connecting the flow-through pressure-vacuum valve 26 to a corresponding vent pipe may be implemented.

Thus, in the example embodiment, the flow-through pressure-vacuum valve 26 is illustrated as having a valve body 32 having a tank-side opening 46 and a vent-side opening 48. In practical embodiments, the tank-side opening 46 is opposite the vent-side opening 48.

As will be described in greater detail herein, the flow-through pressure-vacuum valve 26 includes one or more valves that open in response to a pressure differential between the tank-side (i.e., towards the tank-side flanged portion—e.g., the tank-side opening 46) and the vent-side (i.e., towards the vent side flanged member 34—e.g., the vent-side opening 48). In other characterizations, the pressure differential can be considered between the first vent pipe section 20 and the second vent pipe section 22. In yet other characterizations, the pressure differential can be considered between the storage tank 16 and atmosphere.

As an example, a first pressure relief valve may be implemented as a first positive pressure relief valve within a first passageway. For instance, the first positive pressure relief valve can comprise a first valve seat and a first ball valve member within an axial segment of the first passageway. Here, "axial" is in the vertical orientation when properly installed, so that gravity can transition the first ball valve member into its valve seat, e.g., to close the valve, and hence, close the first passageway. In some embodiments, the axial segment can be coupled via one or more transverse segments. Here, a "transverse' segment is orthogonal to the axial segment (e.g. in a horizontal orientation). The first ball valve member is moved into the first valve seat and is held therein by gravity to close the first passageway. The first ball valve member is moved from the first valve seat by a positive pressure (e.g. higher pressure at the tank-side opening relative to the pressure at the vent-side opening) exceeding a first predetermined threshold. Gravity closes the first valve member when pressure at the tank-side opening of the valve body no longer exceeds pressure at the vent-side opening of the valve body by the first predetermined pressure differential.

Analogously, a second pressure relief valve can be provided. For instance, the second pressure relief valve can be implemented as a second positive pressure relief valve within a second passageway. For instance, the second pressure relief valve can be positioned within an axial segment of the second passageway. Here, the second positive pressure relief valve can comprise a second valve seat and a second ball valve member. The second ball valve member is moved into the second valve seat and is held therein by gravity to close the second passageway. The second ball valve member is moved from the second valve seat by a positive pressure (e.g. higher pressure at the tank-side opening relative to the pressure at the vent-side opening) exceeding a second predetermined threshold. Gravity closes the second valve member when pressure at the tank-side opening of the valve body no longer exceeds pressure at the vent-side opening of the valve body by the second predetermined pressure differential. In example configurations, the second predetermined threshold is greater than the first predetermined threshold.

Similarly, a third pressure relief valve can be provided. For instance, the third pressure relieve valve can be implemented as a negative pressure relief valve (or a vacuum relief valve) within a third passageway. For instance, the third pressure relief valve can be positioned within an axial segment of the third passageway. Here, the negative pressure relief valve can comprise a third valve seat and a third ball valve member. The third valve member is moved into the third valve seat and is held therein by gravity to close the third passageway. The third ball valve member is moved from the third valve seat by a negative pressure (e.g. lower pressure at the tank-side opening relative to the pressure at the vent-side opening) exceeding a third predetermined threshold. Gravity closes the third valve member when pressure at the tank-side opening of the valve body is no longer less than the pressure at the vent-side opening of the valve body by the third predetermined pressure differential.

Figure 3A:
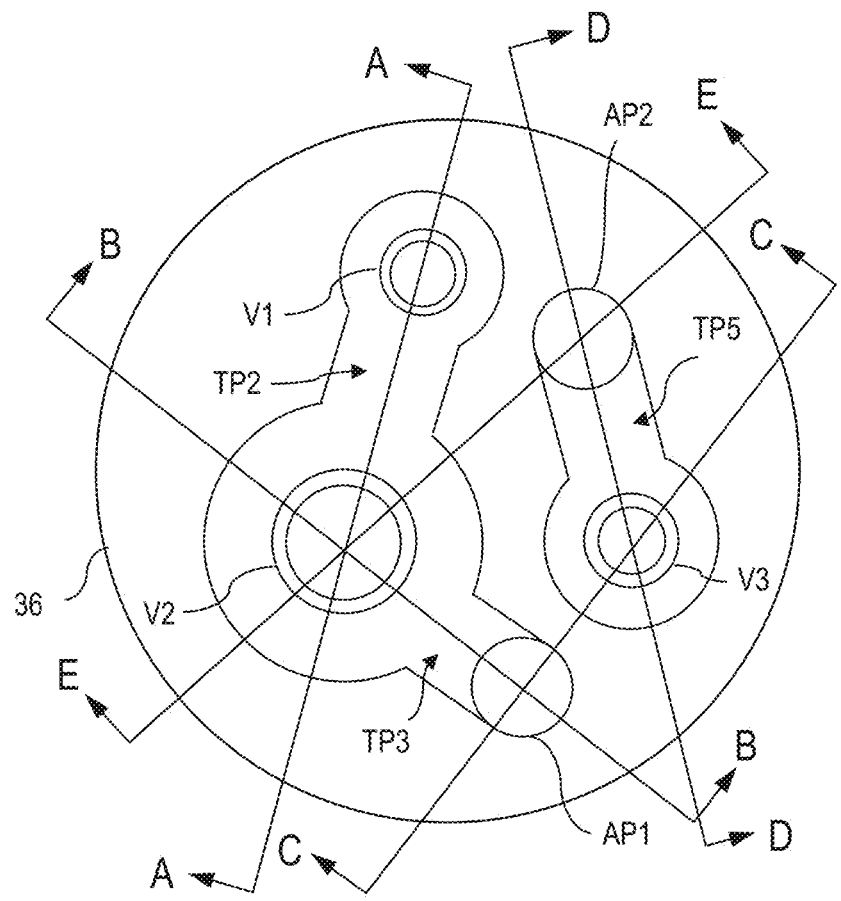
FIG. 3A is a top schematic view of the flow-through pressure-vacuum valve of FIG. 2 illustrating various cross sections.
Figure 3B:
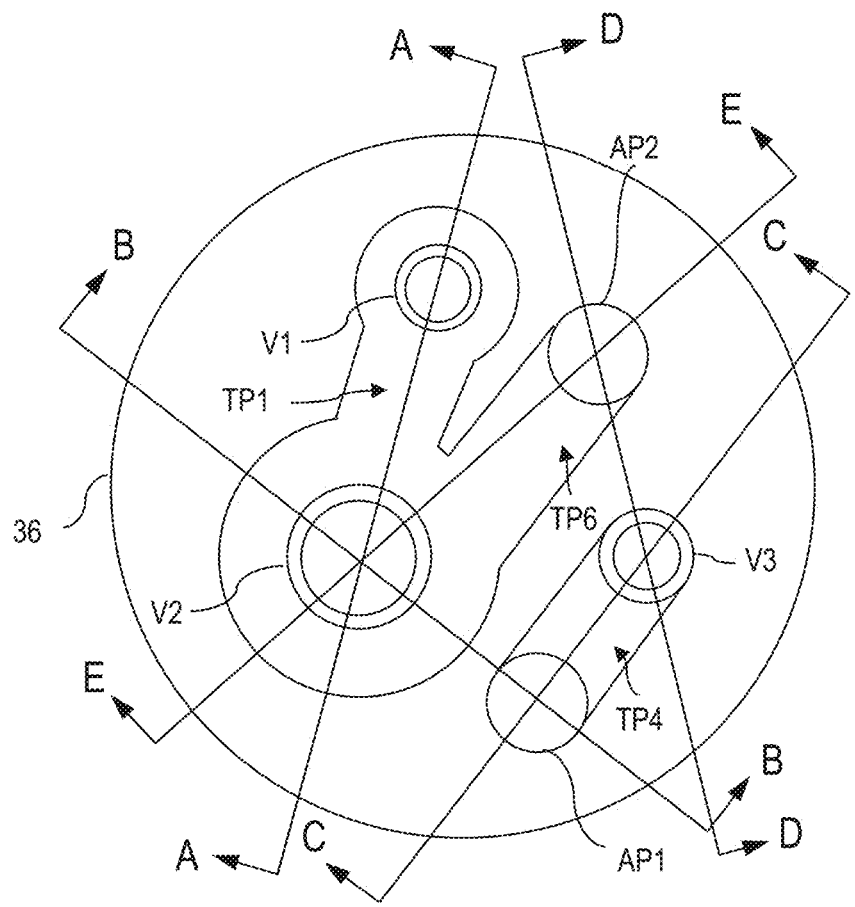
FIG. 3B is a bottom schematic view of the flow-through pressure-vacuum valve of FIG. 3A, illustrating various cross sections where the illustrated view is inverted for convenience of correspondence with FIG. 3A.

Referring to FIG. 3A, a top schematic view of the valve body section 36 is illustrated. Referring to FIG. 3B, a bottom schematic view illustrates the valve body section 36 of FIG. 3A. In FIG. 3B, the view is inverted so that the view is of the bottom face but looking "top down" so that the cross-section lines and features align for easy visual reference.

Generally, there are between one and three valves located within the valve body section 36 of the flow-through pressure-vacuum valve. Referring now to FIGS. 3A and 3B, by way of example, a first valve (e.g., V1) can respond to positive pressure built up in a corresponding storage tank (see underground storage tank 16, FIG. 1). A second valve (e.g., V2, which is optional) can respond to significant positive pressure buildup in the storage tank. For instance, the second valve can provide emergency venting of the storage tank in the case of a rapid increase in pressure within the storage tank, such as could occur during a fuel drop, i.e., fuel delivery. A third valve (e.g., V3) can respond to negative pressure (vacuum) in the storage tank, and thus defines a vacuum relief valve.

In the illustrated embodiment, each valve, (e.g., V1, V2, and V3) is located in a corresponding axial segment of a corresponding passageway (oriented vertically when installed per FIG. 1). This allows gravity to be used to close each valve. The valve body section 36 can include other passageway segments, including a first axial passageway segment AP1, and a second axial passageway segment AP2. Still further, the valve body section 36 can include transverse passageway segment(s), e.g., a passageway segment that is orthogonal to an axial passageway segment.

By way of example, as illustrated in FIG. 3B, a first transverse passageway segment TP1 may couple V1 to V2 about a bottom portion of the valve body section 36. Continuing with this example, as illustrated in FIG. 3A, a second transverse passageway segment TP2 may couple V1 to V2 about a top portion of the valve body section 36. Also, a third transverse passageway segment TP3 may couple V2 to AP1 about the top portion of the valve body section 36. Referring to FIG. 3B, a fourth transverse passageway segment TP4 may couple AP1 to V3 about the bottom portion of the valve body section 36. Referring back to FIG. 3A, a fifth transverse passageway segment TP5 may couple V3 to AP2 about the top portion of the valve body section 36. Referring again to FIG. 3B, a sixth transverse passageway segment TP6 may couple AP2 to V2 about the bottom portion of the valve body section 36.

In general, the combination of valves, axial passageway segments and transverse passageway segments enables each valve to operate in a gravity driven configuration even though V1 and V2 are positive pressure valves and V3 is a negative pressure valve, as described more fully herein. Moreover, as illustrated in FIG. 3A and FIG. 3B, each "passageway" can include any combination of one or more axial segments, transverse segments, or combinations thereof.

To illustrate the functioning of the flow-through pressure-vacuum valve 26, several cross-sections are provided, including a first cross-section along line A-A, a second cross-section along line B-B, a third cross-section along line C-C, a fourth cross-section along line D-D, and a fifth cross-section along line E-E.

Figure 4:
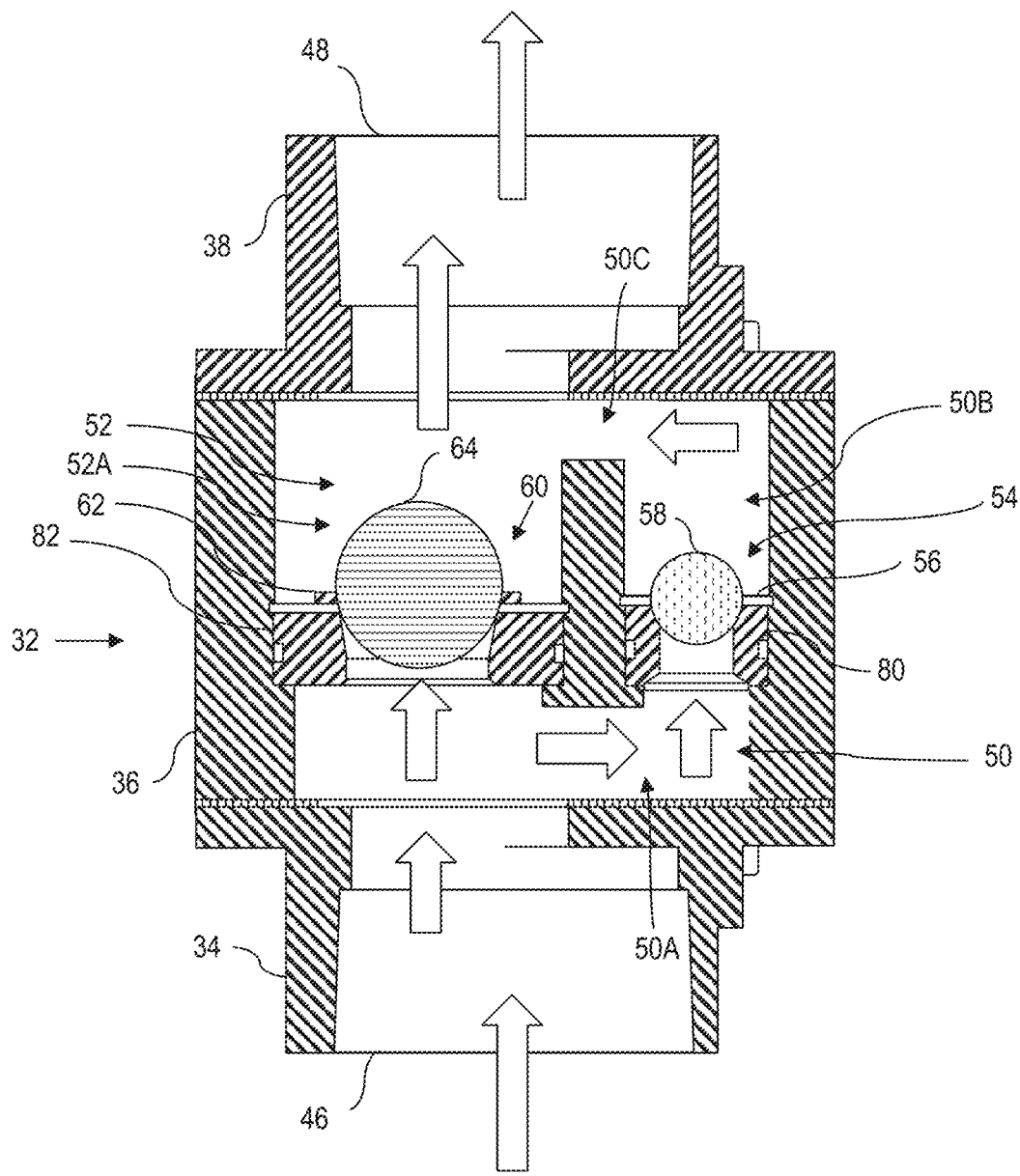
FIG. 4 is a cross-sectional view of the flow-through pressure-vacuum valve of FIG. 3 along line A-A, according to aspects herein.

Referring to FIG. 4, a cross-sectional view of the flow-through pressure-vacuum valve of FIG. 3 along line A-A is illustrated according to aspects herein. In this example, the valve body 32 has a tank-side opening 46 and a vent-side opening 48 and illustrates example configurations for positive pressure relief valve(s).

As illustrated, a first passageway 50 extends through the valve body 32 from the tank-side opening 46 to the vent-side opening 48. As will be seen, this forms the seating location of a positive pressure valve. Where an optional second positive pressure valve is provided (e.g., an emergency venting valve), a second passageway 52 extends through the valve body 32 from the tank-side opening 46 to the vent-side opening 48.

In the illustrated embodiment, a first pressure relief valve 54 is positioned within the first passageway 50 (e.g., see V1—FIG. 3A and FIG. 3B). For instance, the first passageway 50 can comprise an axially extending segment (e.g., a single axial segment as shown), which can optionally couple to transverse segment(s), an example of which is discussed below. Here, the first pressure relief valve 54 is positioned within the axially extending segment of the first passageway 50. Regardless, the first pressure relief valve 54 comprises a first valve seat 56 and a first valve member 58. The first valve member 58 is moved into the first valve seat 56 and is held therein by gravity to close the first passageway 50 (e.g., from completing an open path from the tank-side to the vent-side). The first valve member 58 is moved from the first valve seat 56 to open the first passageway 50 when pressure at the tank-side opening of the valve body 32 exceeds pressure at the vent-side opening of the valve body 32 by a first predetermined pressure differential. Due to gravity, when the pressure differential relative to each side of the first valve member 58 falls below the first predetermined pressure differential, the first valve member 58 once again closes, thus sealing the first passageway 50.

Where a second positive pressure relief valve (e.g., emergency relief valve) is included, a second pressure relief valve 60 is provided within the second passageway 52 (e.g., see V2—FIG. 3A and FIG. 3B). Analogous to that above, in an example embodiment, the second passageway 52 comprises an axially extending segment (e.g., a single axial segment as shown), in which the second pressure relief valve 60 is positioned. The second pressure relief valve 60 comprises a second valve seat 62 and a second valve member 64. The second valve member 64 is moved into the second valve seat 62 and is held therein by gravity to close the second passageway 52 (e.g., from completing an open path from the tank-side to the vent-side). The second valve member 64 is moved from the second valve seat 62 to open the second passageway 52 when pressure at the tank-side opening of the valve body exceeds the pressure at the vent-side opening of the valve body 32 by a second predetermined pressure differential, which is greater than the first predetermined pressure differential. Due to gravity, when the pressure differential relative to each side of the second valve member 64 falls below the second predetermined pressure differential, the second valve member 64 once again closes, thus sealing the second passageway 52.

In an example embodiment, assume the valve body 32 includes a first positive pressure relief valve (e.g., first pressure relief valve 54) and a second, emergency relief valve (e.g., second pressure relief valve 60). In this configuration, the first passageway 50 can follow a route that includes include a first transverse segment 50A (e.g., see TP1—FIG. 3B), a first axial segment 50B (e.g., see V1—FIG. 3A and FIG. 3B), and a second transverse segment 50C (e.g., see TP2—FIG. 3A). The first transverse segment 50A can be positioned along the bottom of the valve body 32 so as to connect the tank-side opening 46 of the valve body 32 (e.g., via the second passageway 52) to the axial segment 50B of the first passageway 50 (which contains the first pressure relief valve 54). Correspondingly, the second transverse segment 50C can be positioned along the top of the valve body 32 so as to connect the vent-side opening 48 of the valve body 32 (e.g., via the second passageway 52) to the axial segment 50B of the first passageway 50.

In some embodiments, the first passageway 50 can include multiple axial segments, e.g., by considering a portion (e.g., an axial segment) of the second passageway 52 that couples the tank-side opening 46 to the first transverse segment 50A and/or by considering a portion (e.g., an axial segment) of the second passageway 52 that couples the vent-side opening 48 to the second transverse segment 50C.

By comparison, in this example, the second passageway 52 can define a "through" axial passageway (second axial segment 52A) that extends entirely through the valve body 32, from the bottom to the top, defining an axially extending aperture from a tank-side opening 46 to a vent-side opening 48. This provides a direct, straight path for a large pressure build up to escape from the tank (not shown) to atmosphere.

Thus, two separate positive pressure flow paths are provided using the same tank-side opening 46 and vent-side opening 48 of the valve body 32. Moreover, as illustrated, the first passageway 50 and the second passageway 52 can share a common tank-side opening 46 and/or vent-side opening 48, such as by using one more transverse passageways to couple a common tank-side opening 46 and/or vent-side opening 48 to each axially oriented positive pressure valve.

Referring to FIG. 3A, FIG. 3B, FIG. 5, FIG. 6, FIG. 7, and FIG. 8 generally, a vacuum-side relief valve system can also be implemented using a gravity valve configuration.

In the illustrated embodiment, a third passageway 66 extends through the valve body 32 from the vent-side opening 48 to the tank-side opening 46 following a series of segments, e.g., in a "serpentine" pattern that winds through the valve body section 36 in a series of connected axial and transverse segments, as described in greater detail below.

Figure 5:
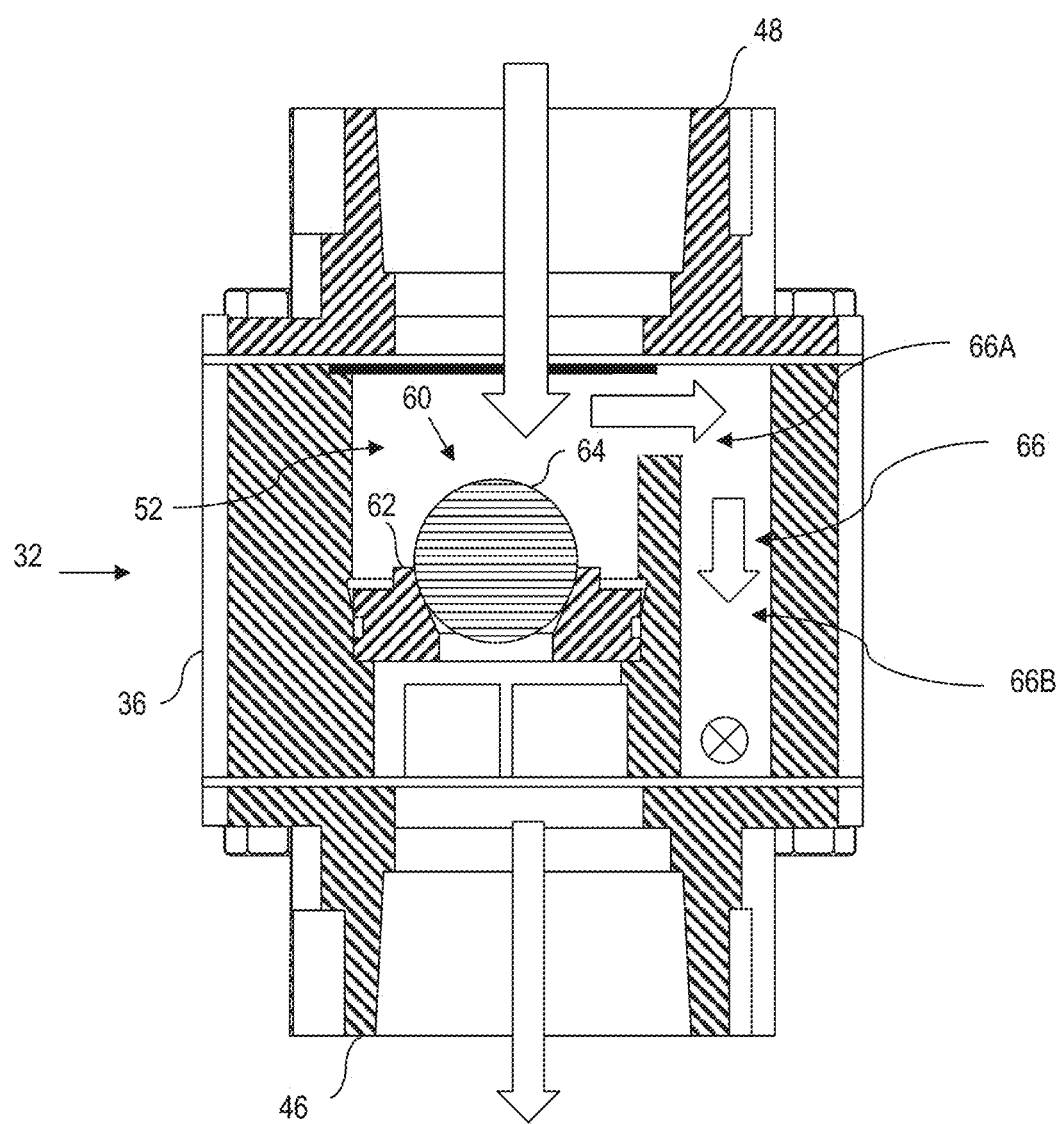
FIG. 5 is a cross-sectional view of the flow-through pressure-vacuum valve of FIG. 3 along line B-B, according to aspects herein.

FIG. 5 is a cross-sectional view of the flow-through pressure-vacuum valve of FIG. 3A and FIG. 3B along line B-B. With reference to FIG. 5, assume a negative pressure buildup at the underground storage tank (not show). Responsive thereto, a positive pressure will flow into the valve body section 36 via the vent-side opening 48. In this illustrative embodiment, the pressure enters generally over the second passageway 52. In this situation, the second pressure relief valve 60 is closed, preventing the pressure to pass directly through the valve body section 36. The relatively higher pressure above the second pressure relief valve 60 ensures that the second pressure relief valve will not open. Analogously, although not shown in FIG. 5, the first pressure relief valve 54 also remains closed, preventing the pressure from passing through the valve body section 36 via the first passageway 50, for analogous reasons.

However, segments of the third passageway 66 are open. For instance, as illustrated, a third transverse segment 66A (e.g., TP3—FIG. 3A) couples the second passageway 52 to a third axial segment 66B (e.g., AP1—FIG. 3A, FIG. 3B).

Figure 6:
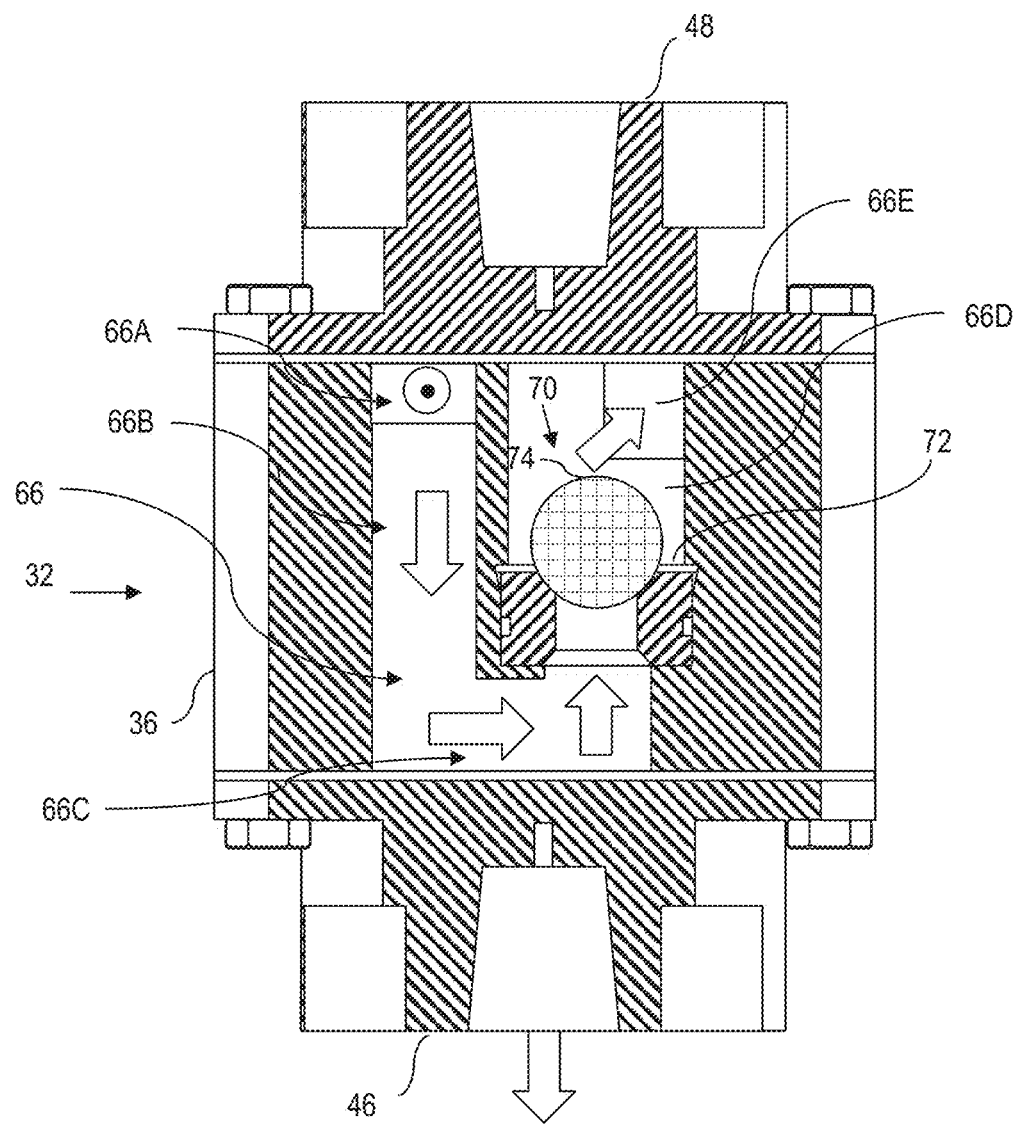
FIG. 6 is a cross-sectional view of the flow-through pressure-vacuum valve of FIG. 3 along line C-C, according to aspects herein.

FIG. 6 is a cross-sectional view of the flow-through pressure-vacuum valve of FIG. 3A and FIG. 3B along line C-C. Referring to FIG. 6, the pressure can flow from the third transverse segment 66A to the third axial segment 66B as described with reference to FIG. 5. The third passageway 66 further couples from the third axial segment 66B to a fourth transverse segment 66C (e.g., TP4—FIG. 3B). The fourth transverse segment 66C couples the third axial segment 66B to a third pressure relief valve 70 (e.g., V3—FIG. 3A, FIG. 3B), which is located in a fourth axial segment 66D.

The third pressure relief valve 70 (vacuum relief valve) comprises a third valve seat 72 and a third valve member 74. The third valve member 74 is moved into the third valve seat 72 and is held therein by gravity to close the third passageway 66 (e.g., from completing an open path from the tank-side to the vent-side). The third valve member 74 is moved from the third valve seat 72 to open the third passageway 66 when pressure at the tank-side opening of the valve body 32 is less than the pressure at the vent-side opening of the valve body by a third predetermined pressure differential (i.e., a vacuum). Notably, because of the serpentine pattern of the third passageway 66, the positive pressure is now below the third valve member 74, and the negative pressure is above the third valve member 74 due to the serpentine pattern of the third passageway (as will be described in further detail).

When the pressure differential exceeds a predetermined threshold, this allows the third valve member 74 to temporarily unseat, allowing the pressure to equalize. Due to gravity, when the pressure differential relative to each side of the third valve member 74 falls below the third predetermined pressure differential, the third valve member 74 once again closes due to gravity.

The flow continues up the fourth axial segment 66D to a fifth transverse segment 66E (e.g., TP5—FIG. 3A).

Figure 7:
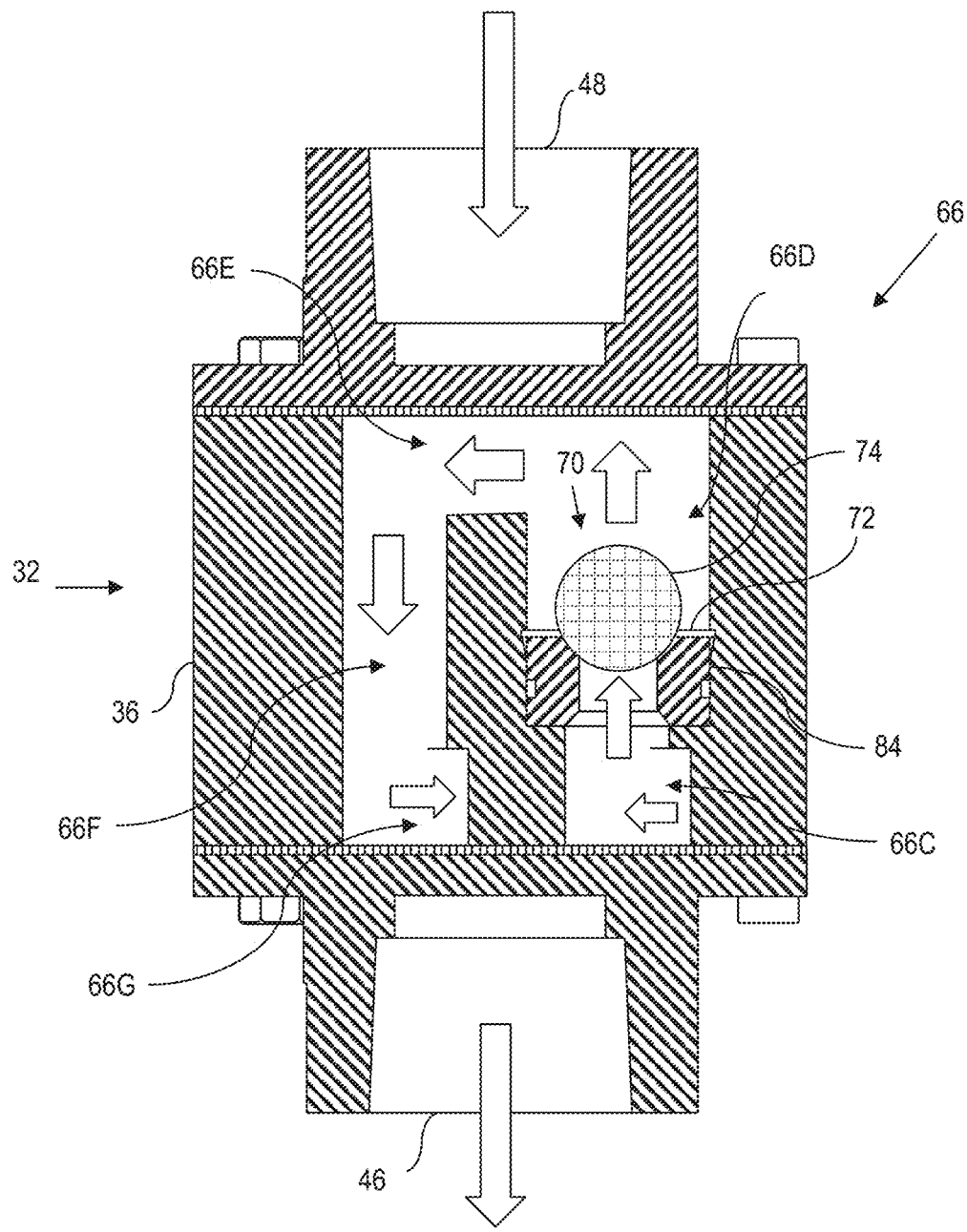
FIG. 7 is a cross-sectional view of the flow-through pressure-vacuum valve of FIG. 3 along line D-D, according to aspects herein.

FIG. 7 is a cross-sectional view of the flow-through pressure-vacuum valve of FIG. 3A and FIG. 3B along line D-D. Referring to FIG. 7, as noted with regard to FIG. 6, the flow, upon the pressure differential exceeding the threshold for the third pressure relief valve 70, flows up the fourth axial segment 66D, and across the fifth transverse segment 66E to a fifth axial segment 66F (e.g., AP2—FIG. 3A, FIG. 3B). The flow continues from the fifth axial segment 66F to a sixth transverse segment 66G (e.g. TP6—FIG. 3B).

Figure 8:
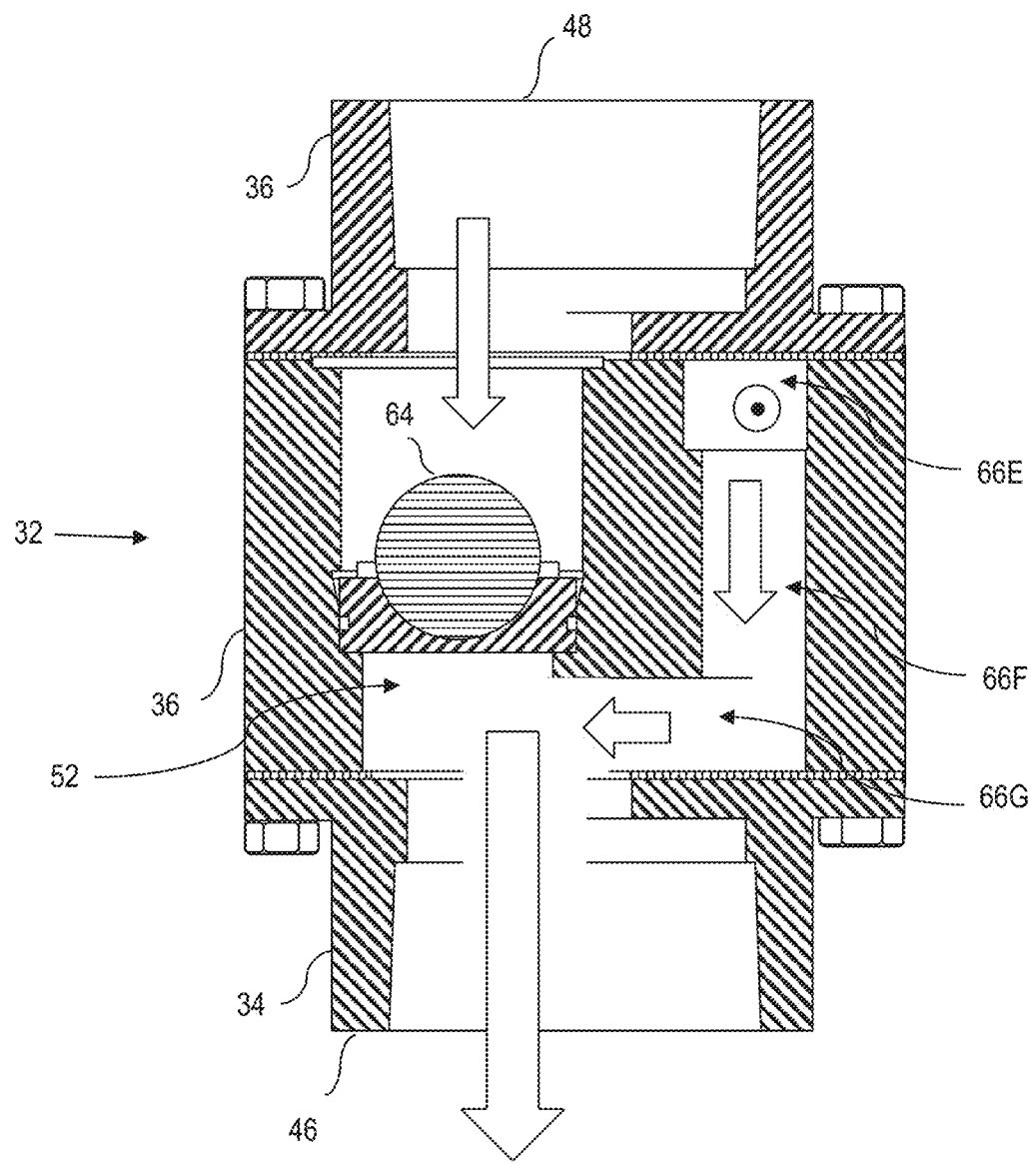
FIG. 8 is a cross-sectional view of the flow-through pressure-vacuum valve of FIG. 3 along line E-E, according to aspects herein.

FIG. 8 is a cross-sectional view of the flow-through pressure-vacuum valve of FIG. 3A and FIG. 3B along line E-E. Referring to FIG. 8, as noted with reference to FIG. 7, the flow continues from the fifth transverse segment 66E to the fifth axial segment 66F, and from the fifth axial segment 66F to the sixth transverse segment 66G. The sixth transverse segment 66G couples the fifth axial segment 66F back to the second passageway 52, where the flow can continue out the tank-side opening 46.

Referring to FIG. 5, FIG. 6, FIG. 7, and FIG. 8 generally, in the illustrated example embodiment, the third pressure relief valve 70 can be implemented as a negative pressure relief valve within the third passageway 66 due to the serpentine pattern that allows positive pressure to work against gravity. In summary, FIG. 5, FIG. 6, FIG. 7, and FIG. 8 clarify the flow path to operate the third pressure relief valve 70, which can be seen with reference to FIGS. 3A and 3B.

Analogously, with brief reference back to FIGS. 3A and 3B, a flow to operate the third pressure relief valve can be seen as a positive pressure entering the vent-side opening of the valve body axially, entering the valve body via an axial segment of the second passageway (entering from above V2), traversing across an upper portion of the valve body via TP3, flowing axially down AP1 towards a bottom portion of the valve body, traversing across a bottom portion of the valve body via TP4, pushing axially up against V3 to open the third pressure relief valve 70 to transition back to an upper portion of the valve body, traversing across TP5 to AP2, axially flowing down TP5 back towards the bottom portion of the valve body, traversing across TP6 back to a segment of the second passageway towards the bottom (below V2), and axially exiting the tank-side opening.

As another example configuration, a characterization of the third passageway can generally comprise a first axially extending (passageway) segment coupling the vent-side opening of the valve body to a first transverse (passageway) segment, a second axially extending (passageway) segment coupling the first transverse (passageway) segment to a second transverse (passageway) segment, and a third axially extending (passageway) segment coupling the second transverse (passageway) segment to the tank-side opening of the valve body, where the third pressure relief valve is positioned in the second axially extending (passageway) segment.

With reference to FIG. 3A through FIG. 8 generally, in an example embodiment, the first valve seat 56 of the first pressure relief valve 54 can comprise a first conical indentation in the valve body. Correspondingly, the first valve member 58 can comprise a first free-floating spherical ball received in the first conical indentation so as to be held therein by gravity. Analogously, the second valve seat 62 of the second pressure relief valve 60 can comprise a second conical indentation in the valve body. Correspondingly, the second valve member 64 can comprise a second free-floating spherical ball received in the second conical indentation so as to be held therein by gravity. Yet analogously, the third valve seat 72 of the third pressure relief valve 70 can comprise a third conical indentation in the valve body. Correspondingly, the third valve member 74 can comprise a third free-floating spherical ball received in the third conical indentation so as to be held therein by gravity.

In a practical application, the first free-floating spherical ball ("normal" positive pressure relief) is the smallest, the second free-floating spherical ball ("large" positive pressure relief) is the largest, and the third free-floating spherical ball (negative pressure relief) is medium sized, having a size between the first free-floating spherical ball and the second free-floating spherical ball. Thus, a volume of the second free-floating spherical ball is larger than a volume of the first free-floating spherical ball, and a volume of the third free-floating spherical ball is larger than the volume of the first free-floating spherical ball and the volume of the third free-floating spherical ball is smaller than the volume of the second free-floating spherical ball. In other applications, the spherical balls can be the same size, or each spherical ball can have a size, weight, or combination thereof, which is designated by the function that the spherical ball is intended to perform, e.g., unseat against the pull of gravity to transition a pressure difference that exceeds a predetermined pressure differential. Notably, because each spherical ball seats in a corresponding conical indentation, each valve can function as a one-way valve, only opening against gravity, e.g., when a pressure below the corresponding spherical ball exceeds the pressure above the spherical ball by a designed for threshold (based upon ball size, ball weight, seat configuration, combination thereof, etc.,). Upon pressure equalization or at least pressure difference relief below the associated threshold, gravity pulls the spherical ball back into the corresponding conical indentation.

In some embodiments, a first shelf at least partially surrounds the first valve seat. The first shelf is inclined to return the first free-floating spherical ball to the first conical indentation by gravity. This incline provides a place for the valve member to travel until gravity pulls the valve member back into the corresponding seat. In a practical application, the incline can fan out, e.g., up to 80 degrees. In other applications, the fan out can be more than 80 degrees.

Analogously, in some embodiments, a second shelf at least partially surrounds the second valve seat. The second shelf is analogously inclined to return the second free-floating spherical ball to the second conical indentation by gravity. This incline provides a place for the valve member to travel until gravity pulls the valve member back into the corresponding seat. In a practical application, the incline can fan out, e.g., up to approximately 50 degrees. In other applications, the fan out can be more than 50 degrees.

Likewise, in some embodiments, a third shelf at least partially surrounds the third valve seat. The third shelf is inclined to return the third free-floating spherical ball to the third conical indentation by gravity. This incline provides a place for the valve member to travel until gravity pulls the valve member back into the corresponding seat. In a practical application, the incline can fan out, e.g., up to 100 degrees. In other applications, the fan out can be over 100 degrees.

Yet further, in some embodiments, the flow-through pressure-vacuum valve can comprise a first shelf at least partially surrounding the first valve seat, where the first shelf is inclined to return the first free-floating spherical ball to the first conical indentation by gravity. Likewise, the flow-through pressure-vacuum valve can comprise a second shelf at least partially surrounds the second valve seat, where the second shelf is inclined to return the second free-floating spherical ball to the second conical indentation by gravity. Yet further, the flow-through pressure-vacuum valve can comprise a third shelf at least partially surrounding the third valve seat, where the third shelf is inclined to return the third free-floating spherical ball to the third conical indentation by gravity.

In general, the incline in the shelf for each valve member can be the same or different. For instance, the first shelf can exhibit an angle having a value that is greater than that of the second shelf, but that is smaller than that of the third shelf. In an example embodiment, the incline of the first shelf is at approximately 60 degrees, the incline of the second shelf is at approximately 20 degrees, and the incline of the third shelf is at approximately 100 degrees.

In practice, a first cracking pressure for the first pressure relief valve (corresponding to the first predetermined pressure differential) can be determined by a ball size of the first free-floating spherical ball, a composition of the first free-floating spherical ball, a sidewall property (such as angle, dimensions, surface, etc.,) of the first conical indentation, or a combination thereof. Similarly, a second cracking pressure for the second pressure relief valve (corresponding to the second predetermined pressure differential) can be determined by a ball size of the second free-floating spherical ball, a composition of the second free-floating spherical ball, a sidewall property (such as angle, dimensions, surface, etc.,) of the second conical indentation, or a combination thereof. Yet further, a third cracking pressure for the third pressure relief valve (corresponding to the third predetermined pressure differential) can be determined by a size of the third free-floating spherical ball, a composition of the third free-floating spherical ball, a sidewall property (such as angle, dimensions, surface, etc.,) of the third conical indentation, or a combination thereof.

In an example embodiment, the valve body 32 is comprised of a material such as aluminum. The first free-floating spherical ball is made of stainless steel, the second free-floating spherical ball is made of stainless steel, and the third free-floating spherical ball is made of stainless steel. In this regard, to facilitate machining, a first insert 80 (see FIG. 4) can be press fit into the valve body for the first conical indentation, where the first insert is made of stainless steel. Likewise, a second insert 82 (see FIG. 4) can be press fit into the valve body for the second conical indentation, where the second insert is made of stainless steel. Yet further, a third insert 84 (see FIG. 7) can be press fit into the valve body for the third conical indentation, where the third insert is made of stainless steel.

In the illustrated embodiment, the pressure-vacuum valve can open at a first predetermined positive pressure within the storage tank in order to allow the excessive positive pressure to vent to atmosphere, e.g., via the first valve. Also, an excessive and rapid positive pressure in the storage tank, e.g., from being filled, can open at a second predetermined pressure within the storage tank in order to allow the excessive positive pressure to vent to atmosphere, e.g., via the second valve. The pressure-vacuum valve can also open at a predetermined third pressure level (e.g., a predetermined vacuum level) within the storage tank to allow the storage tank to vent to atmosphere, e.g., via the third valve. In this regard, the second predetermined pressure is higher than the first predetermined pressure so that the second pressure relief valve performs emergency venting in the case of a rapid increase in storage tank pressure. However, in practice, the cracking pressures for the first and second pressure relief valves and the vacuum relief valve can be set in accordance with national and local fire codes.

In-Line Pressure-Vacuum Valve Test Unit

Aspects herein further provide an inline pressure-vacuum valve test unit that allows testing in place of a corresponding pressure-vacuum valve, e.g., the pressure vacuum valve 26 described above with reference to FIG. 1-FIG. 8. In this regard, the inline pressure-vacuum valve test unit can form part of a inline pressure-vacuum valve test system, e.g., in combination with a vent pipe and/or pressure-vacuum valve.

It is sometimes desirable, and in certain circumstances, required, that pressure-vacuum valves are inspected to ensure proper operation according to predefined standards. Conventionally, this requires disassembling the pressure-vacuum valve from a corresponding vent pipe, attaching the pressure-vacuum valve to a test fixture, and testing the pressure-vacuum valve according to predefined standards. Depending upon the outcome, the pressure-vacuum valve may be returned to service, repaired, or replaced. Regardless, a pressure-vacuum valve must be re-installed back into the vent pipe. This takes considerable time, and places wear on the vent pipe. This also creates an opportunity for errors in operation regardless of testing outcome because the pressure-vacuum valve is normally tested in a test fixture removed from the vent pipe and is thus, out of context of its intended application. Thus, a positive test result in the test apparatus may not translate to a similar outcome when installed in the vent pipe, e.g., due to dirt/debris, airflow, and other factors. Aspects herein solve this by providing an inline test fixture that becomes part of the vent pipe, and allows proper testing in place of a corresponding pressure-vacuum valve without disturbing the corresponding storage tank.

Figure 9:
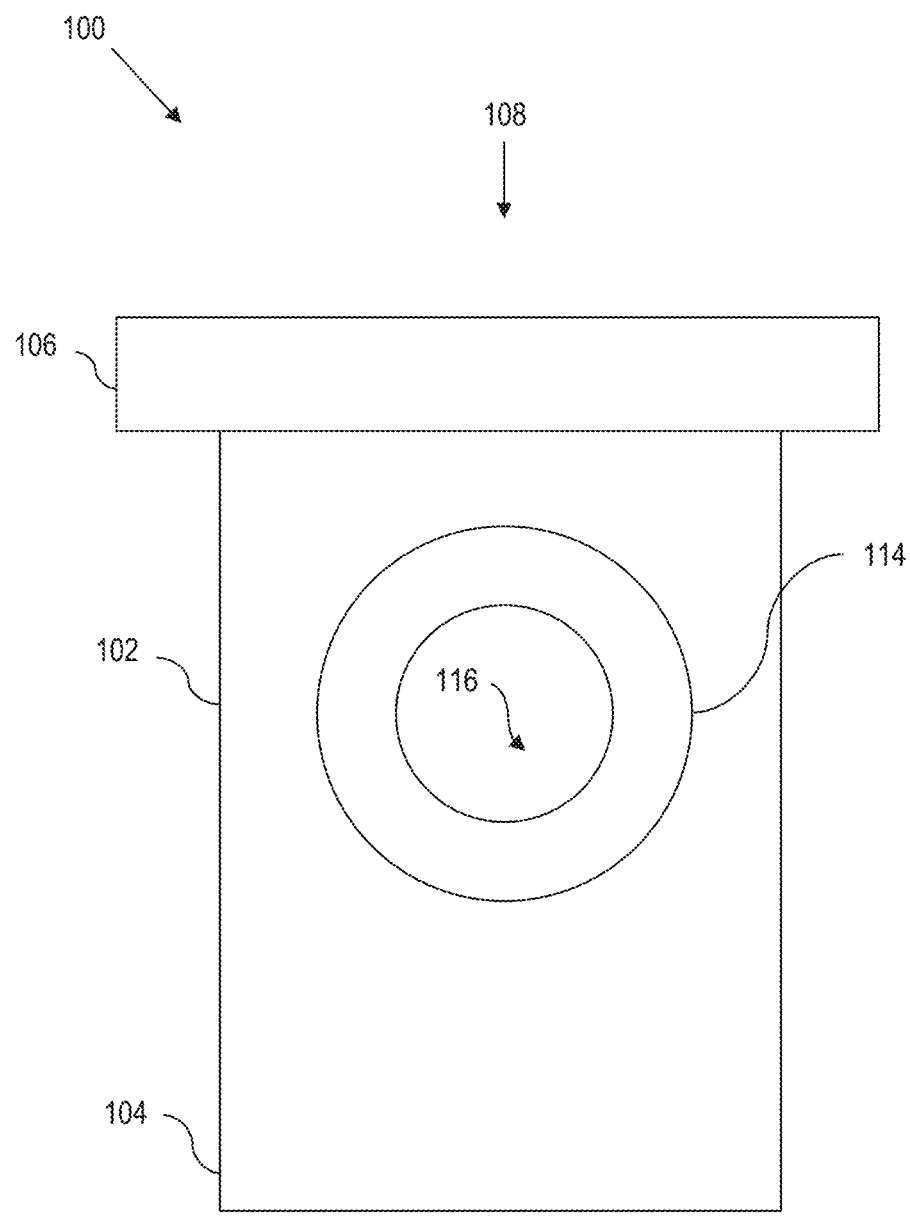
FIG. 9 is an example in-line pressure-vacuum valve test unit according to aspects herein.

Referring to FIG. 9, an in-line pressure-vacuum valve test unit 100 includes a body 102, having a tank-side end 104, a valve-side end 106, and an axial passageway 108 extending entirely through the body from the tank-side end 104 to the valve-side end 106.

Figures 10, 11:
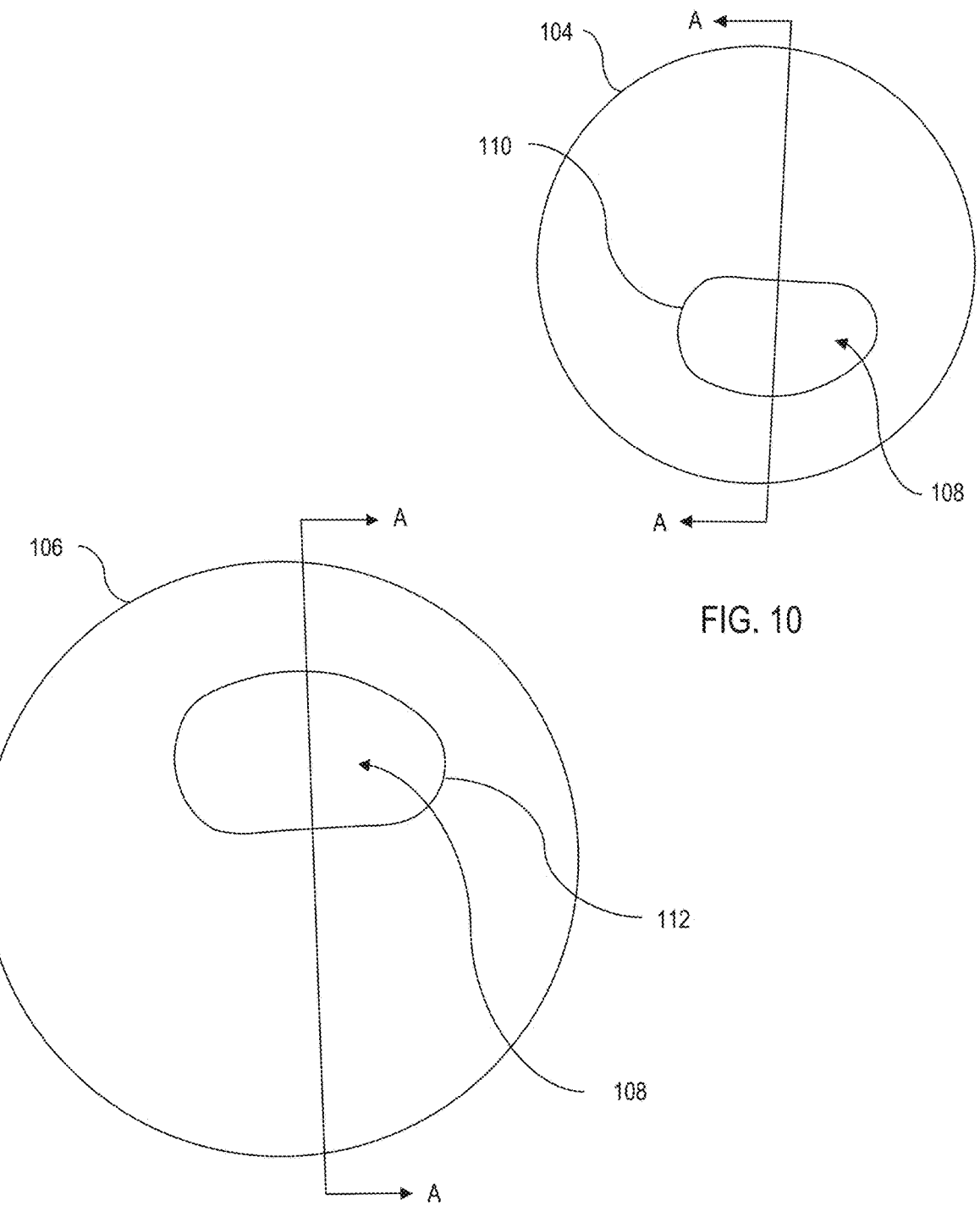
FIG. 10 is an example top view of the in-line pressure-vacuum valve test unit of FIG. 9.
FIG. 11 is an example bottom view of the in-line pressure-vacuum valve test unit of FIG. 9.

Referring briefly to FIG. 10, which illustrates a bottom view of the test unit 100 of FIG. 9, the axial passageway 108 defines a tank-side port 110 on an end face thereof. Correspondingly, referring briefly to FIG. 11, a top view of the test unit of FIG. 9 illustrates that the axial passageway 108 defines a valve-side port 112 on an end face thereof. Referring to FIG. 10 and FIG. 11, in the illustrated example, the end face of the tank-side end 104 is generally circular. In this regard, the tank-side port 110 can have any desired shape, but is constrained to fit within a semicircle (exits the body 102 within only one half of the end face). Likewise, in the illustrated example embodiment the end face of the valve-side end 106 is generally circular. In this regard, the valve-side port 112 can have any desired shape but is constrained to fit within a semicircle (exits the body 102 within only one half of the end face), such that the tank-side port 110 and the valve-side port are opposite of each other. In practice, the body 102, tank-side end 104, valve-side end 106, or combinations thereof can take on different shapes or configurations.

Referring back to FIG. 9, the body 102 also includes a test port 114 in a sidewall of the body 102 A radial passageway 116 extends from the test port 114 into the axial passageway 108.

Figure 12:
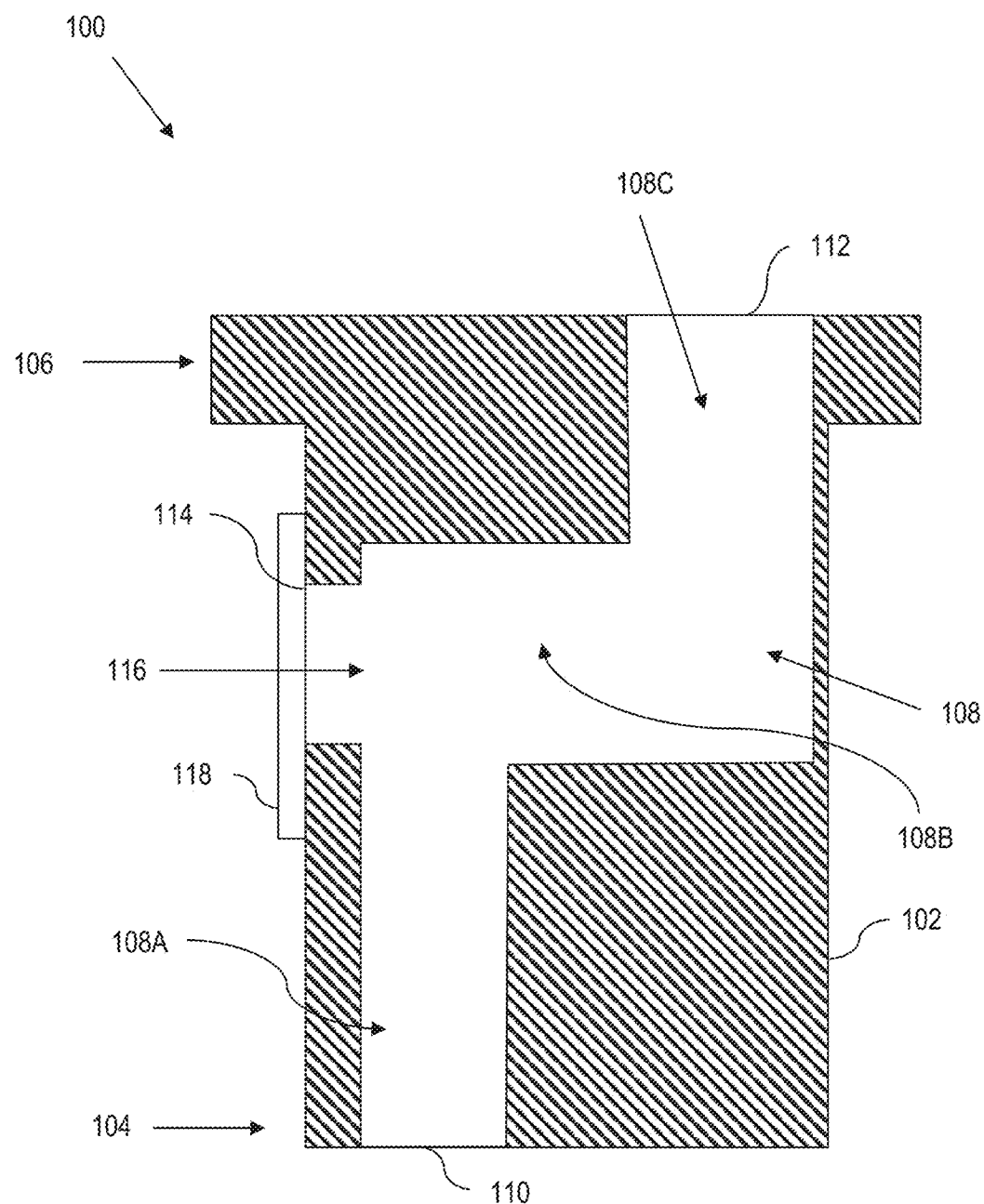
FIG. 12 is a cross-sectional view of the in-line pressure-vacuum valve test unit of FIG. 9, taken along lines A-A of FIG. 11, showing an installed cap.

Referring to FIG. 12, a cross section of the in-line pressure-vacuum valve test unit 100 is shown taken along line A-A in FIG. 10 and FIG. 11. As best illustrated in FIG. 12, the axial passageway 108 is defined by a first axial segment 108A, a shoulder segment 108B, and a second axial segment 108C. The shoulder segment 108B aligns with the radial passageway 116 so as to connect the radial passageway 116 with the axial passageway 108. More particularly, the in-line pressure-vacuum valve test unit 100 of FIG. 12 illustrates a configuration having first axial segment extending from the tank-side port into the body, the second axial segment extending from the valve-side port into the body where the second axial segment is offset from the first axial segment, and a shoulder segment connecting the first axial segment to the second axial segment.

A cap 118 is user attachable to, and removable from the test port 114. For instance, the cap 118 can be user attachable to the test port 114, thereby sealing access from outside the in-line pressure-vacuum valve test unit into the axial passageway. In this configuration, a test probe is insertable into the test port 114 when the cap 118 is removed from the test port 114. For instance, the cap 118 can threadably couple, snap in, press fit in, press fit over, or otherwise form a seal thereby sealing access from outside the in-line pressure-vacuum valve test unit 100 into the axial passageway 108.

Figure 13:
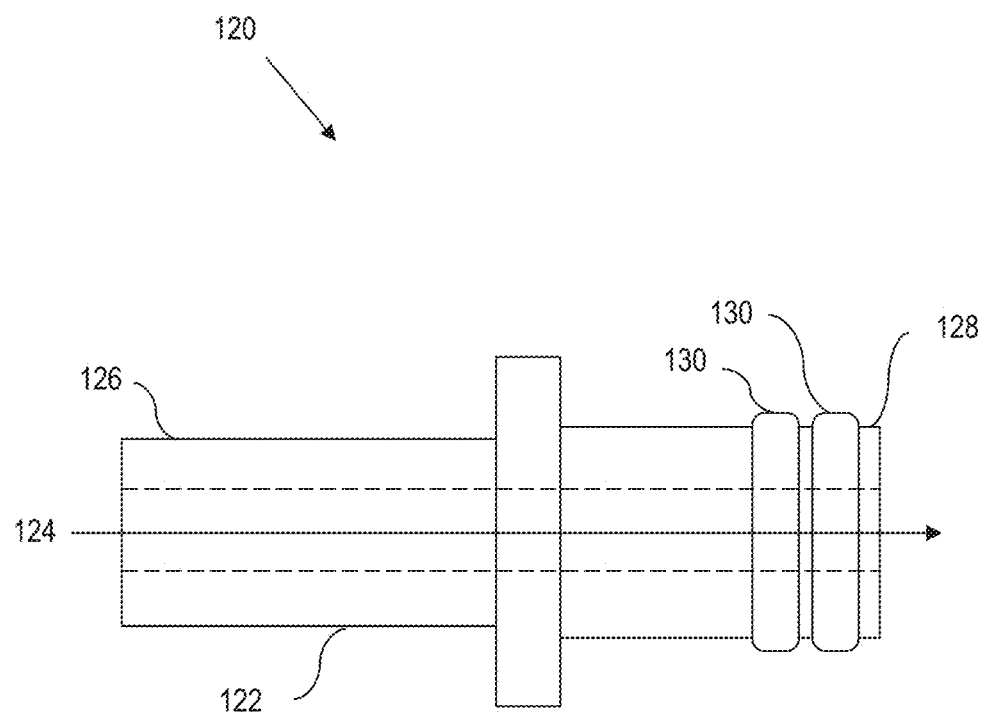
FIG. 13 is a view of an example test probe for use with an in-line pressure-vacuum valve test unit.

Referring to FIG. 13, a test probe 120 is also provided. The test probe 120 includes a cylindrical tube body 122 having a hollow 124 therethrough. The tube body 122 defines a probe end 126 and a plug end 128. The probe end 126 can include attachment features for fittings, etc., e.g., to attach a positive pressure source, vacuum source, etc. The plug end 128 includes at least one sealing member 130. In an example embodiment, the test probe 120 comprises at least one sealing member 130 implemented as an O-ring that is positioned along an end portion thereof (e.g., proximate to the plug end 128) that extends into the shoulder segment 108B of the axial passageway 108 so as to form a seal therewith.

For instance, as illustrated, two sealing members 130 are implemented as O-rings. Each O-ring may seat in a groove or other structure to hold the O-rings to the plug end 128. In this regard, the plug end 128 is designed to have a tight tolerance with regard to the shoulder segment 108B (FIG. 12).

Figure 14:
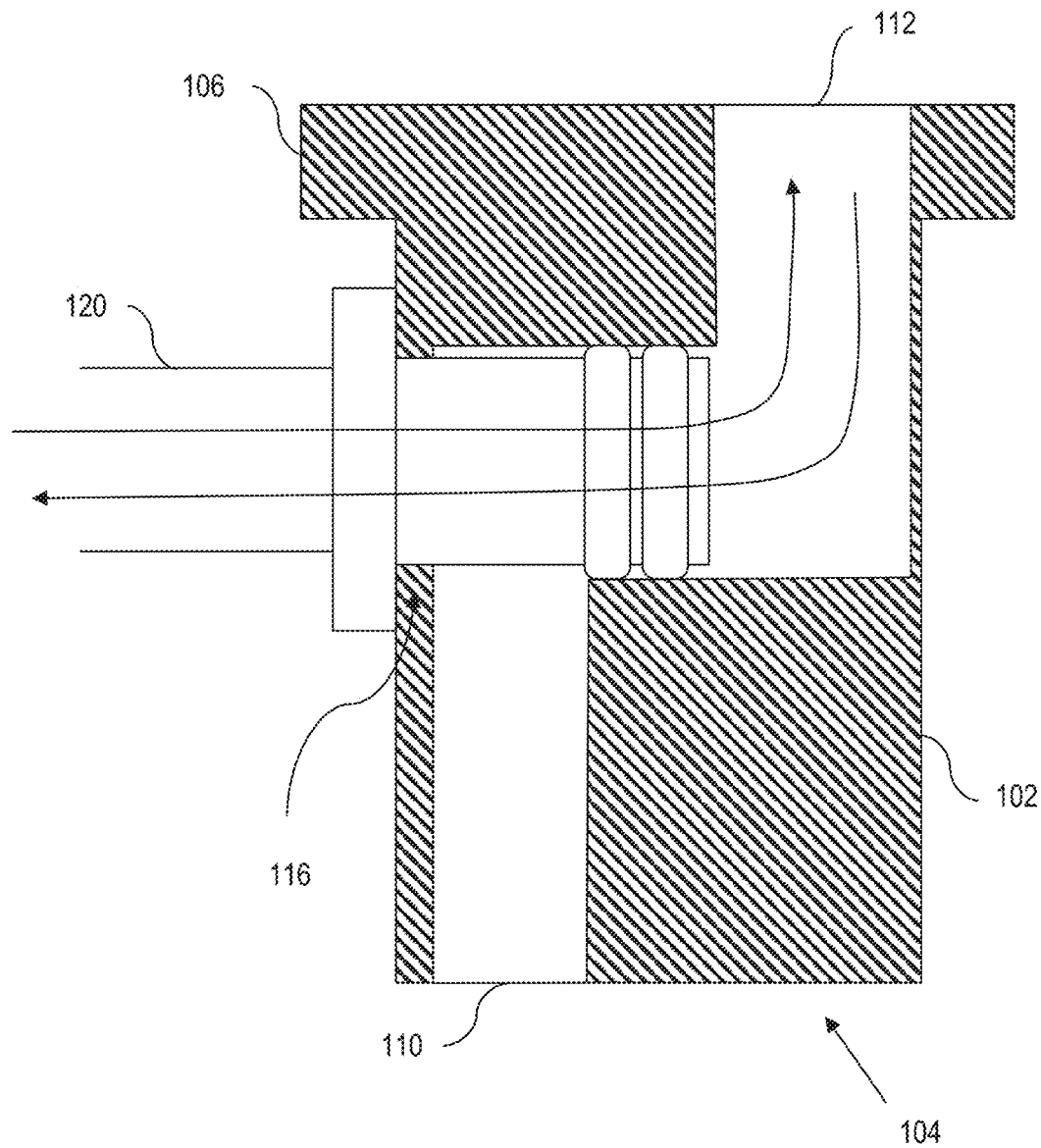
FIG. 14 is an example test probe.

Referring to FIG. 14, the cap 118 of FIG. 12 is removed, this exposing the radial passageway 116 to atmosphere via the test port 114. With the cap 118 removed, the test probe 120 is inserted into the test port 114 and secures to the body 102.

When inserted into the test port 114, the test probe 120 extends through the radial passageway 116 and into the axial passageway 108. For instance, as illustrated, the plug end 128 of the test probe 120 engages the shoulder segment 108B of the axial passageway 108 such that the O-rings form a sealing relationship with the sidewalls of the shoulder segment 108B. In this regard, a seal is effectively formed between the tank-side port 110 and the test probe 120 via the O-rings preventing flow from the tank-side through the shoulder segment 108B. However, the test probe 120 has a hollow therein. As such, a positive pressure or negative pressure introduced in the hollow of the test probe 120 passes through the shoulder portion via the tube body 122 into the axial segment 108C, thus exiting upstream to the pressure-vacuum valve. In this regard, the pressure-vacuum valve can be tested in place by merely installing the test probe 120 into the test port 114.

In some embodiments, the test probe 120 can be permanently installed, wherein, a cap can be utilized to seal the access to the test probe 120. Here, the test probe 120 is installed so that in a default state, the test probe 120 does not block a pathway between a corresponding pressure-vacuum valve, e.g., the pressure vacuum valve 26 described above with reference to FIG. 1-FIG. 8, and a pathway to a corresponding storage tank. However, in a test state, the test probe 120 blocks the pathway between the pressure-vacuum valve and the storage tank as described more fully herein. For instance, the test probe 120 can thread, slip, snap or otherwise traverse between the default state and test state. In some embodiments, the test probe 120 can threadably connect, press fit, snap into or otherwise secure to the body 102.

Thus, the test probe seals the axial passageway between the tank-side port and a valve-side port. Moreover, the hollow in the test probe cooperates with the axial passageway to create a path through the hollow in the test probe, into the axial passageway, and through the valve-side port. In this regard, a distal end of the test probe receives a connection from a test apparatus capable of creating at least one of a positive pressure and a vacuum.

Figure 15:
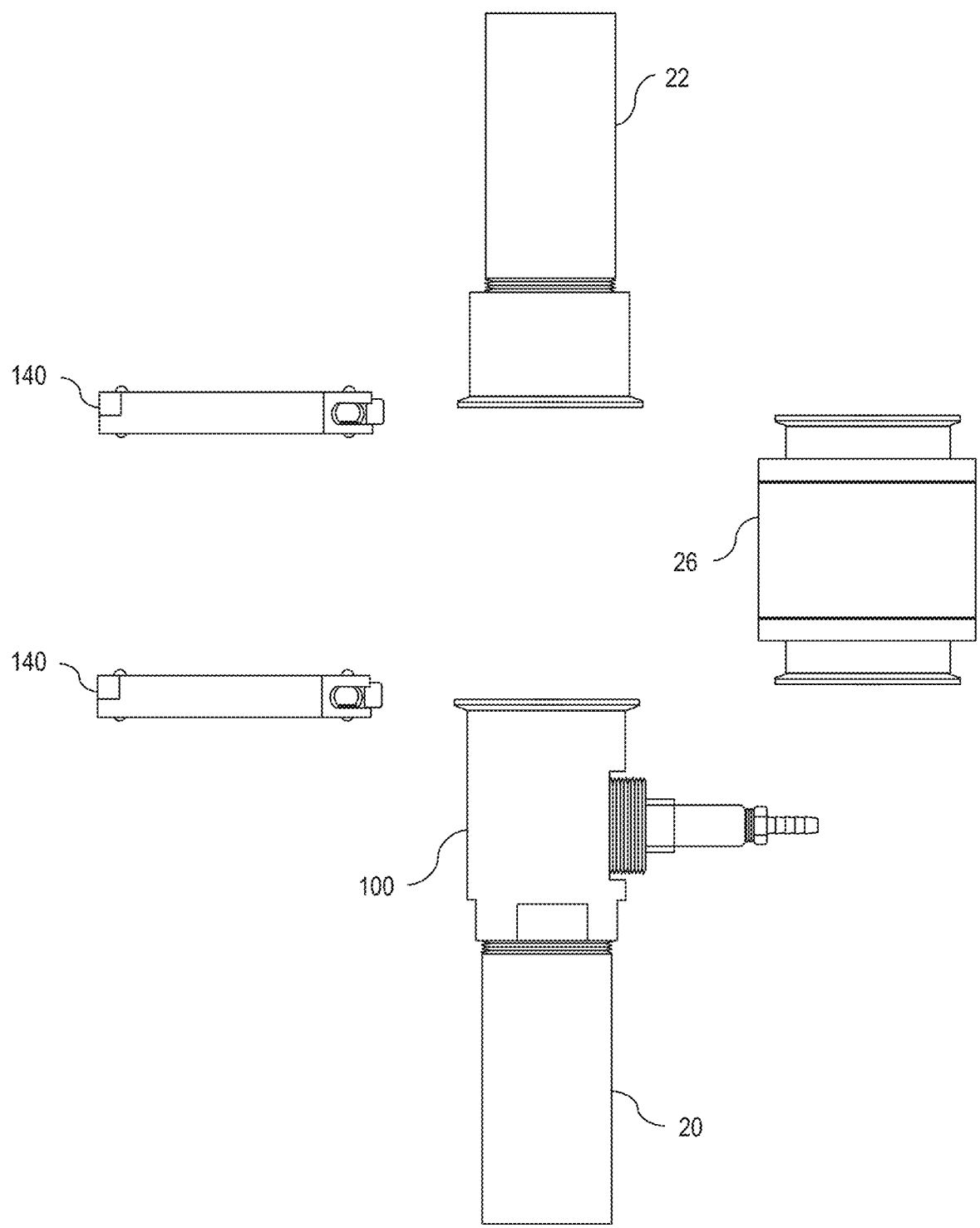
FIG. 15 is a break apart diagram of a vent pipe assembly having a pressure-vacuum valve and an in-line pressure-vacuum valve test unit, according to aspects herein.
Figure 16:
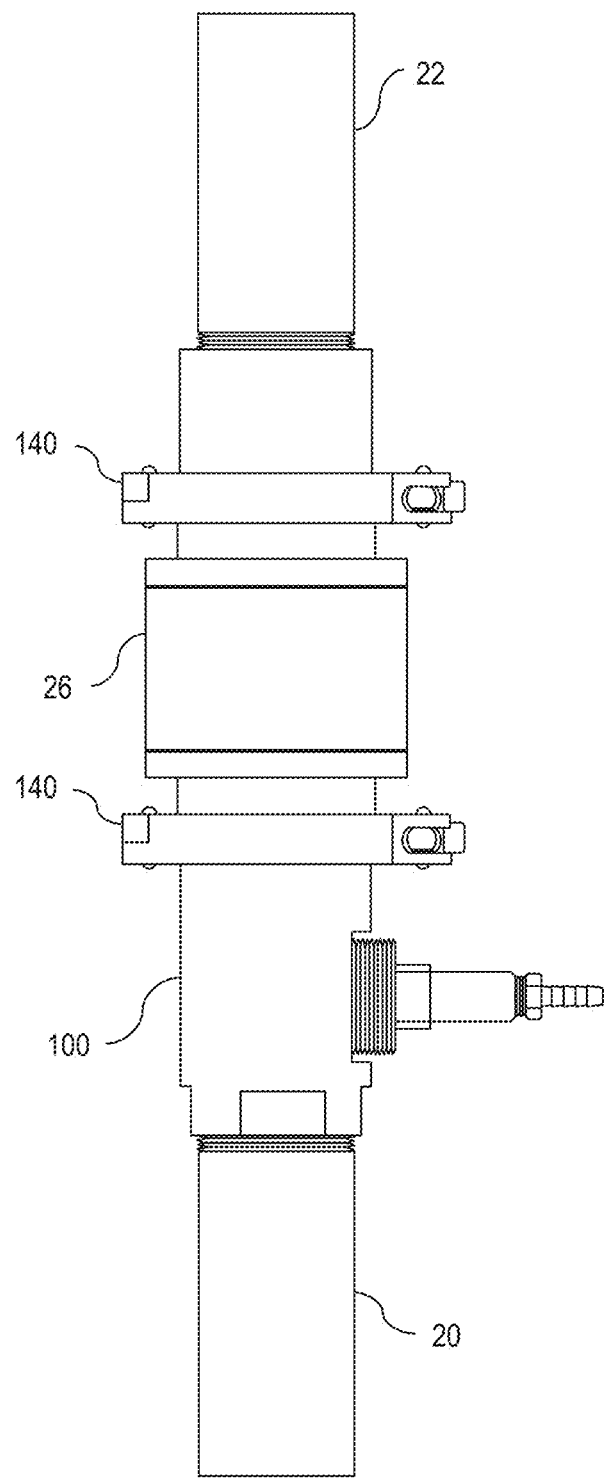
FIG. 16 is an assembled view of the components of FIG. 15.

Referring to FIG. 15 and FIG. 16, an example of a vent pipe is illustrated according to aspects herein. The vent pipe system includes a first vent pipe section 20 and a second vent pipe section 22. As illustrated, an in-line pressure-vacuum valve test unit 100 is upstream of the first vent pipe section 20. An in-line pressure-vacuum valve 26 is upstream of the in-line pressure-vacuum valve test unit 100. The second vent pipe section 22 is upstream of the in-line pressure-vacuum valve 26. The in-line pressure-vacuum valve test unit 100 is intended not to be a replacement item. As such, the in-line pressure-vacuum valve test unit 100 can be permanently attached to the first vent pipe section 20, threadably attached to the first vent pipe section 20, etc.

The in-line pressure-vacuum valve 26, as disclosed herein, has only three moving parts, all of which are balls, thus providing a highly reliable pressure-vacuum valve that represents a significant improvement over previous pressure-vacuum valves. However, in some circumstances, it may be desirable to remove the in-line pressure-vacuum valve 26 from the vent pipe system. In this regard, a securement, e.g., clamps 140 can be used to temporarily secure the in-line pressure-vacuum valve to the vent pipe system.

Figure 17:
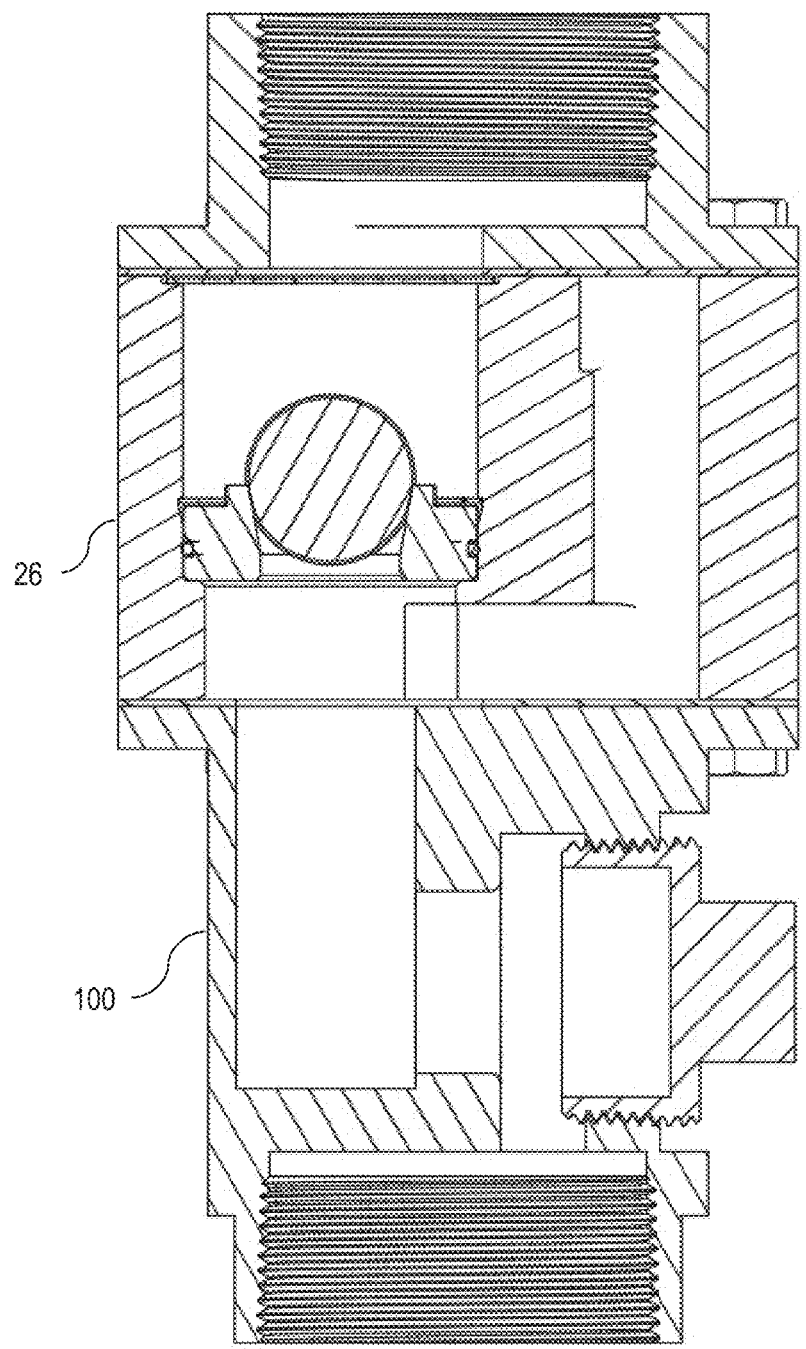
FIG. 17 is a cross sectional view illustrating an example pressure-vacuum valve attached upstream of an in-line pressure-vacuum valve test unit, according to aspects herein.

Alternatively, as illustrated in FIG. 17, the in-line pressure-vacuum valve 26 can threadably connect to, the in-line pressure-vacuum valve test unit 100 (or first vent pipe section). In other embodiments, the in-line pressure-vacuum valve 26 can bolt, threadably connect, press fit in, compression fit or otherwise secure (permanently or temporarily to the corresponding vent pipe system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. An in-line pressure-vacuum valve test system comprising:
   an in-line pressure-vacuum valve test unit comprising:
      a body having a tank-side end, a valve-side end, and an axial passageway extending entirely through the body from the tank-side end to the valve-side end, the axial passageway defining a tank-side port and a valve-side port;
      a test port in a sidewall of the body;
      a radial passageway extending from the test port into the axial passageway; and
      a test probe having a hollow therethrough, the test probe inserted into the test port such that:
         the test probe extends through the radial passageway and into the axial passageway;
         the test probe seals the axial passageway between the tank-side port and a valve-side port; and
         the hollow in the test probe cooperates with the axial passageway to create a path through the hollow in the test probe, into the axial passageway, and through the valve-side port;
   a vent pipe having a first vent pipe segment coupled to the tank-side port; and
   a pressure-vacuum valve coupled to the in-line pressure-vacuum valve test unit, wherein the pressure-vacuum valve comprises:
      a valve body having a tank-side opening and a vent-side opening;
      a pressure relief passageway that extends through the valve body from the tank-side opening to the vent-side opening;

a vacuum release passageway that extends through the valve body from the tank-side opening to the vent-side opening; and a pressure relief valve within the pressure relief passageway, the pressure relief valve comprising:
  a valve seat and a valve member, the valve member moved into the valve seat and held therein by gravity to close the pressure relief passageway, the valve member being moved from the valve seat to open the pressure relief passageway when pressure at the tank-side opening of the valve body exceeds pressure at the vent-side opening of the valve body by a first predetermined pressure differential;
  a vacuum relief valve within the vacuum release passageway, the vacuum relief valve comprising:
    a valve seat and a valve member, the valve member moved into the valve seat and held therein by gravity to close the vacuum relief passageway, the valve member being moved from the valve seat to open the vacuum relief passageway when pressure at the tank-side opening of the valve body is less than the pressure at the vent-side opening of the valve body by a predetermined pressure differential.

2. The in-line pressure-vacuum valve test system of claim 1, wherein the pressure-vacuum valve is in-line with the vent pipe upstream of the in-line pressure-vacuum valve test unit.

3. The in-line pressure-vacuum valve test system of claim 2, wherein the flow-through pressure-vacuum valve is positioned at a height of less than six feet (approximately 1.83 meters) from the surface from which the vent pipe emerges from a fuel storage tank, and the in-line pressure-vacuum valve test unit is in-line with the vent pipe below the flow-through pressure-vacuum valve.

4. The in-line pressure-vacuum valve test system of claim 2, wherein the flow-through pressure-vacuum valve is positioned at a height of up to four feet (approximately 1.22 meters) from the surface from which the vent pipe emerges from a fuel storage tank, and the in-line pressure-vacuum valve test unit is in-line with the vent pipe below the flow-through pressure-vacuum valve.

* * * * *